United States Patent [19]
Parks et al.

[11] Patent Number: 5,357,622
[45] Date of Patent: Oct. 18, 1994

[54] APPARATUS FOR QUEING AND STORING DATA WRITES INTO VALID WORD PATTERNS

[75] Inventors: Terry J. Parks, Round Rock; Darius D. Gaskins, Austin; Michael L. Longwell, Austin; Keith D. Matteson, Austin, all of Tex.

[73] Assignee: Dell U.S.A., L.P., Austin, Tex.

[21] Appl. No.: 589,341

[22] Filed: Sep. 27, 1990

[51] Int. Cl.⁵ .............................................. G06F 12/00
[52] U.S. Cl. .................... 395/425; 395/250; 364/926.1; 364/926.2; 364/926.3; 364/966.1; 364/966.4; 364/968.1; 364/DIG. 2; 364/246.3; 364/260.7
[58] Field of Search .............. 395/425, 250, 600, 800, 395/500; 365/189.05

[56] References Cited

U.S. PATENT DOCUMENTS

| | | | |
|---|---|---|---|
| 4,109,310 | 8/1978 | England et al. | 364/200 |
| 4,157,586 | 6/1979 | Gannon et al. | 364/200 |
| 4,204,634 | 5/1980 | Barsuhn et al. | 371/40.1 |
| 4,291,370 | 9/1981 | Charles | 364/200 |
| 4,347,567 | 8/1982 | DeTar, Jr. et al. | 395/425 |
| 4,366,538 | 12/1982 | Johnson et al. | 364/200 |
| 4,371,928 | 2/1983 | Barlow et al. | 364/200 |
| 4,424,563 | 1/1984 | Lynch | 364/200 |
| 4,680,702 | 7/1987 | McCarthy | 364/200 |
| 4,750,154 | 6/1988 | Lefsky et al. | 365/189 |
| 4,805,098 | 2/1989 | Mills, Jr. et al. | 395/250 |
| 4,959,771 | 9/1990 | Ardini, Jr. et al. | 395/250 |
| 5,224,214 | 6/1993 | Rosich | 395/250 |

*Primary Examiner*—Thomas C. Lee
*Assistant Examiner*—Paul Harrity
*Attorney, Agent, or Firm*—James Huffman; Thomas Devine

[57] ABSTRACT

A digital computer system has a central processor unit (CPU) and a store queue facility. The store queue facility receives full digital words or segments thereof (bytes) for intermediate storage prior to storage in an addressable unit such as a dynamic random access memory (DRAM). The store queue facility has a plurality of registers for storing digital words and bytes for storage at different, discreet addresses in the addressable unit. The store queue has circuitry for assembling bytes into a digital word or into a plurality of bytes for ultimate storage in the addressable unit. Some combinations of bytes are not valid and will therefore not be entered together in a single digital word.

18 Claims, 40 Drawing Sheets

APPARATUS FOR QUEING AND STORING DATA WRITES INTO VALID WORD PATTERNS

CROSS REFERENCE TO RELATED APPLICATIONS

This application is related to the following U.S. patent applications:

| SERIAL NO. | TITLE | INVENTOR | FILING DATE |
|---|---|---|---|
| 490,003 | Method and Apparatus for Performing Multi-Master Bus Pipelining | Zeller, et al. | 03/07/90, still pending |
| 540,983 | Error Correction Code Pipeline for Interleaved Memory | Matteson, et al. | 06/19/90, now abandoned |
| 541,103 | Computer System Having a Selectable Cache Subsystem | Holman | 06/19/90, now U.S. Pat. No. 5,276,832 |
| 529,985 | Processor and Cache Controller Interface Lock Jumper | Holman, et al. | 05/25/90, now abandoned |
| 540,651 | Address Enabling System and Method for Memory Modules | Holman, et al. | 06/19/90, now U.S. Pat. No. 5,241,643 |
| 532,046 | Multiple DRAM Assemblies Using a Single PCB | Holman | 05/25/90, now abandoned |
| 532,045 | Power-On Coordination System and Method for Multi-Processor | Holman, et al. | 05/25/90, now U.S. Pat. No. 5,070,450 |
| 540,049 | A Digital Computer Having a System for Sequentially Refreshing an Expandable Dynamic RAM Memory Circuit | Matteson, et al. | 06/19/90, now abandoned |
| 530,137 | Dual Path Memory Retrieval System For An Interleaved Dynamic RAM Memory Unit | Gaskins, et al. | 05/25/90, now U.S. Pat. No. 5,261,068 |
| 559,230 | Processor Which Performs Memory Access in Parallel with Cache Access and Method Employed Thereby | Parks, et al. | 07/27/90, now abandoned |
| 516,628 | Digital Computer Having An Error Correction Code (ECC) System with Comparator Integrated Into Re-Encoder | Longwell, et al. | 04/03/90, now abandoned |
| 516,894 | Minimized Error Correction Bad Bit Decoder | Longwell, et al. | 04/30/90, now abandoned |
| 516,606 | Shared Logic for Error Correction Syndrome Encoding | Longwell, et al. | 04/30/90, now abandoned |
| 559,872 | Computer Data Routing System | Zeller, et al. | 07/27/90, now abandoned |

BACKGROUND OF THE INVENTION

1. Field of the Invention

This invention relates to a digital computer system having a store queue facility. More particularly, it concerns a store queue facility wherein digital words are assembled within the store queue prior to storage in a system memory or the like.

2. Description of Related Art

In the early days of digital computing, reading from and writing to the high speed memory, as well as peripheral apparatus, was done directly. Reading from and writing to peripheral equipment was so extremely slow compared to the computer operational speeds that it soon became evident that buffer registers could be employed to rapidly accept the information being read from or written to peripheral equipment. The buffer registers then could be separately emptied into either the peripheral equipment in the case of a write, or into the computer in the case of a read.

It was later determined that buffering of write operations to the computer main memory is desirable because there are many more read operations than write operations in the ordinary program. Therefore, buffering the write operations avoids interference with the read operations and consequently provides much more useful computing time. The write buffer is commonly known as a store queue.

The store queue facility then is employed to decouple memory write time from the processor store cycle time. That is, the store queue acts as an intermediate store between the processor and the memory. This implementation gives priority to memory reads which improves system performance.

This invention involves use of the store queue, but greatly enhances this facility by assembling one or more bytes (8 bits) into a single word in the store queue prior to writing into the memory or other addressable unit.

BRIEF SUMMARY OF THE INVENTION

A digital computer system is provided with a store queue facility. When there is to be a write to memory or to some other addressable unit such as a disc, the information to be written is intercepted and queued in a register file for later transmission to the memory or other addressable unit. This queuing step interrupts the memory write cycle so that it does not interfere with memory read cycles, saving an appreciable amount of time.

Until recently, personal computers used a word size of a single byte (8 bits): As a result, a large number of computer programs are based on single byte manipulation. Also, many input/output devices are addressable by a single byte. With a 32 bit word size in current personal computers, often a single byte is stored at one address, followed by another byte at that same address, followed by a third byte at that address, and finally by a fourth byte at the same address but requiring a separate memory reference for each byte to enter the four bytes in a 32 bit word. To reduce the need for separate memory references, the store queue facility of this invention assembles the bytes from sequential memory references at the same address into a full 32 bit word or some lesser combination of bytes. That is, one, two, three or four bytes may be assembled at the same address. Then at some subsequent time, a memory reference is made frown the store queue facility, writing as much as a 32 bit assembled word (4 bytes) into an address with a single memory write reference rather than a maximum of four separate memory write references. The system is implemented in a plurality of store queue data registers with an accompanying plurality of address registers containing the addresses at which the data in the store queue data registers is to be stored in memory. Also provided are a plurality of segment present registers (byte present registers)for indicating the position that a given byte is to occupy in a word at a specified address. Specified segments (bytes) are written into the store queue by the central processing unit (CPU) of the digital computer system.

Other digital computers use write buffers between the CPU and memory instead of store queue architecture, per se. The position of bytes is deduced by the address and size of a partial word. This technique is, of course, within the ambit of this invention.

The control circuitry for the store queue facility directs the accumulation of the segments (bytes) into a specified address at the byte present location, thereby assembling two or more bytes at the specified address. The digital computer system then provides a signal to the store queue facility to write the assembled data word into the system memory or other addressable unit at the address specified.

As described above, it is seen that memory references can be eliminated, saving computing time. Also, in systems which use error correction code (ECC), time is saved. In those systems, each time the ECC code is generated, it is generated on a 32 bit word. Therefore, if a single byte is to be written, the entire 32 bit word must be extracted from memory and combined with the byte of interest. The ECC is calculated on the entire 32 bit word and it and the 32 bit word are rewritten into the memory. Each time a new byte is entered into that word, a new ECC code must be generated. Therefore, as many as four new codes are generated for a 32 bit word that is accessed four times. This invention can eliminate the need for such multiple referencing to generate an ECC code.

This invention further includes a facility enabling an accumulation of only a subset of all possible byte combinations in the store queue. That is, the I/O channel expects only the valid byte combinations that were determined by the original computer architecture.

The principal object of this invention, therefore, is to assemble digital data words in a store queue facility prior to writing into the memory to reduce the number of memory write references.

Another object of this invention is to assemble only valid patterns of bytes in the store queue facility prior to writing into the memory.

These and other objects will be evident in the detailed description that follows.

DETAILED DESCRIPTION OF THE INVENTION

A digital computer system has a store queue for storing information to be written to storage devices, including main memory. According to this invention, a plurality of segments of data, in a valid combination, may be accumulated in the store queue prior to being written into a selected storage device. The following detailed description illustrates the subsystem that enables this concept.

Figure 1:
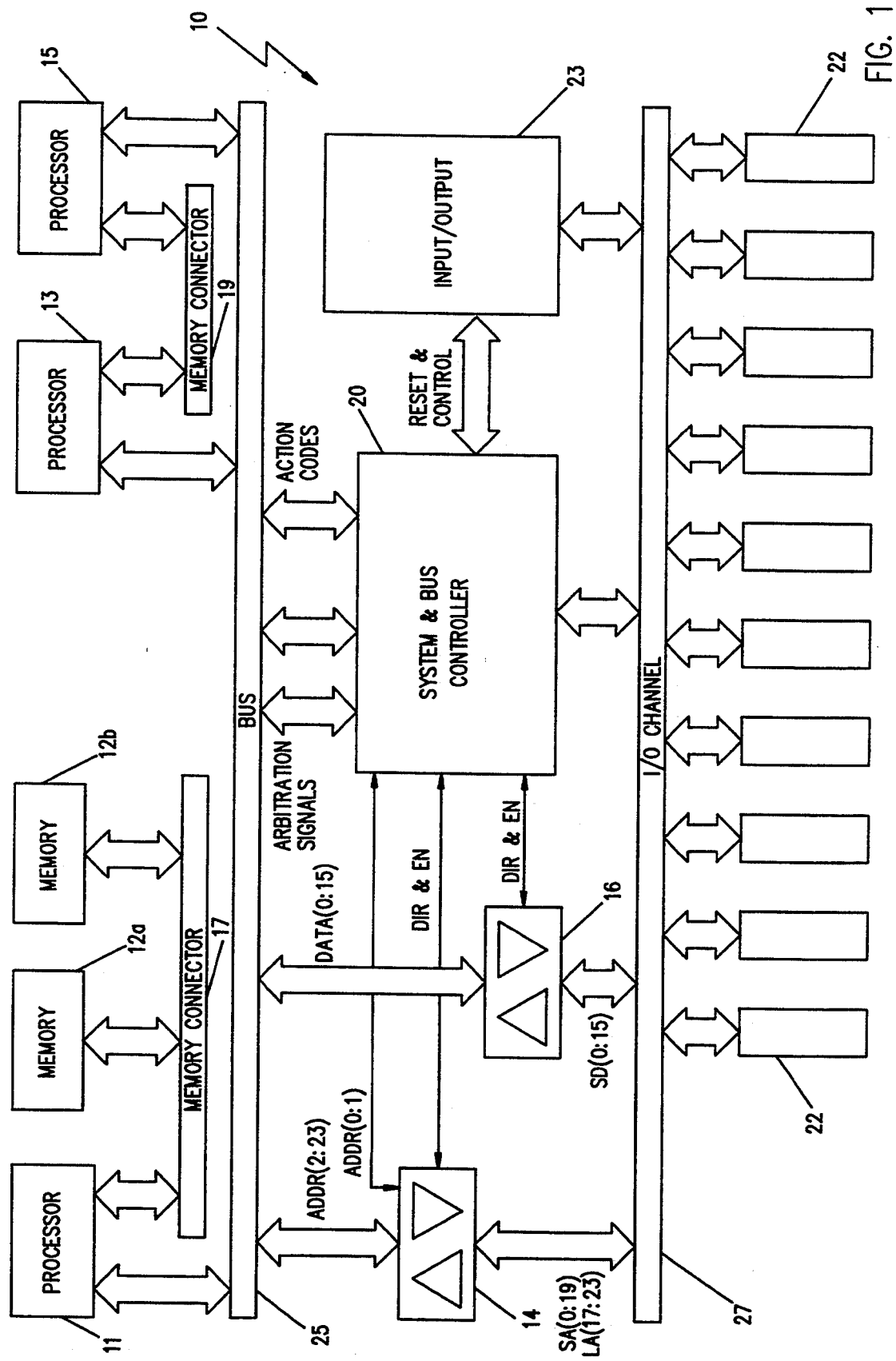
FIG. 1 is a block diagram of the digital computer system of the present invention.

Referring first to FIG. 1, there is illustrated a computer system 10 having separate processors 11, 13, and 15. Memories 12a and 12b are associated with processor 11 through memory connector 17. The number of processors are not relevant to this invention. In the preferred embodiment, memories 12a and 12b are dynamic random access memories (DRAMs) and either one of the processors 13 and 15 may access memories 12a or 12b through processor 11. The memory bus cycle and the I/O bus cycle are the same except for a memory or I/O cycle designation. Processors 11, 13 and 15 are interconnected to one another through bus 25. Address and data signals are communicated to and from the I/O channel 27 by bi-directional drivers 14 and 16 respectively. These drivers are controlled by the system and bus controller 20 through the DIR and EN signals as shown. Arbitrations signals, as well as routing codes, are developed by an arbiter which is contained within a system and bus controller 20. Input/output 23 represents the various peripheral devices which communicate with both the I/O channel 27 and the system and bus controller 20. System and bus controller 20 and input/output 23 are connected to I/O channel 27. The system address (SA), system data (SD), and the local address (LA) are applied from the bus 25 to I/O channel 27 through drivers 14 and 16 and under control of gating circuitry contained within the system and bus controller 20. Card slots 22 connected to I/O channel 27 may he used for extra peripheral devices or additional memory in the conventional fashion. Additional memory installed in slots 22 is accessed through a memory bus cycle to the I/O channel.

Figure 2:
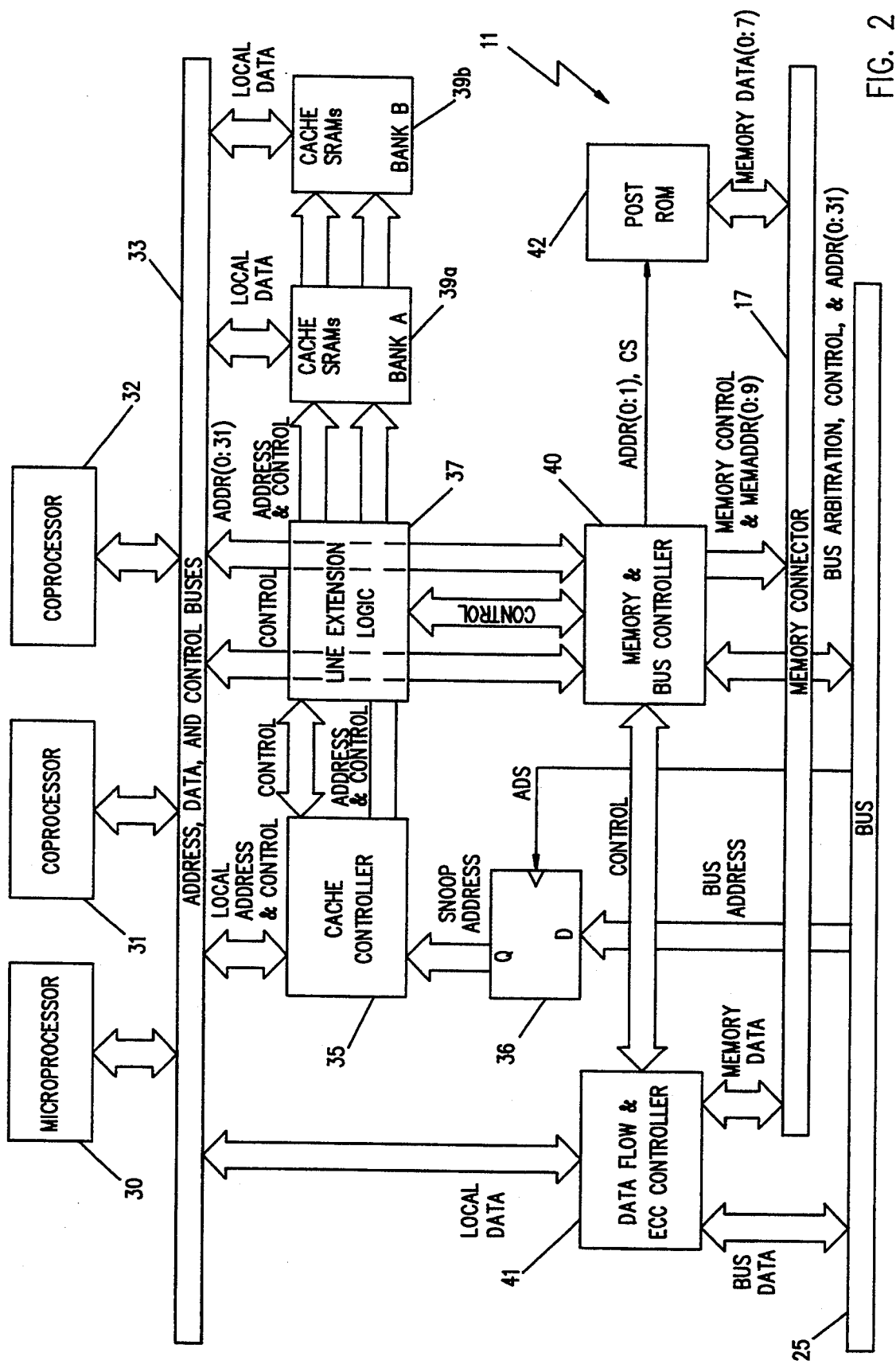
FIG. 2 is a block diagram of a single master processor included in the computer system of FIG. 1.

FIG. 2 illustrates processor 11 (personal computer system in this preferred embodiment) in block form. Processor 11 is made up of microprocessor 30 and co-processor 31 and 32. In this preferred embodiment, microprocessor 30 is an Intel Type 80386, co-processor 31 is an Intel Type 80387, and co-processor 32 is a floating point unit made by Weitek Company. Of course, other type microprocessors and co-processors could be used as well. All are interconnected through address, data and control buses 33. Cache controller 35 connects to bus 33 and also, through line extension logic 37, to cache SRAMs 39a and 39b. Snoop address latch 36 latches bus addresses and sends them to cache controller 35. Data flow and ECC controller 41 is connected to bus 33 and receives local data therefrom. Controller 41 is connected to memory and bus controller 40 which is also connected to bus 33, receiving and transmitting control and address information. Controller 41 includes the circuitry for the data store queue and byte identification. Memory and bus controller 40 includes the store queue and control for addresses and byte identification. Controllers 40 and 41 are shown connected to memory connector 17. Memory data from controller 41 travels through memory data path 21 to memory connector 17. POST ROM 42 is read only memory (ROM) used for power-on, self test. Controller 40 and POST ROM 42 are shown connected to memory connector 17.

Figure 3:
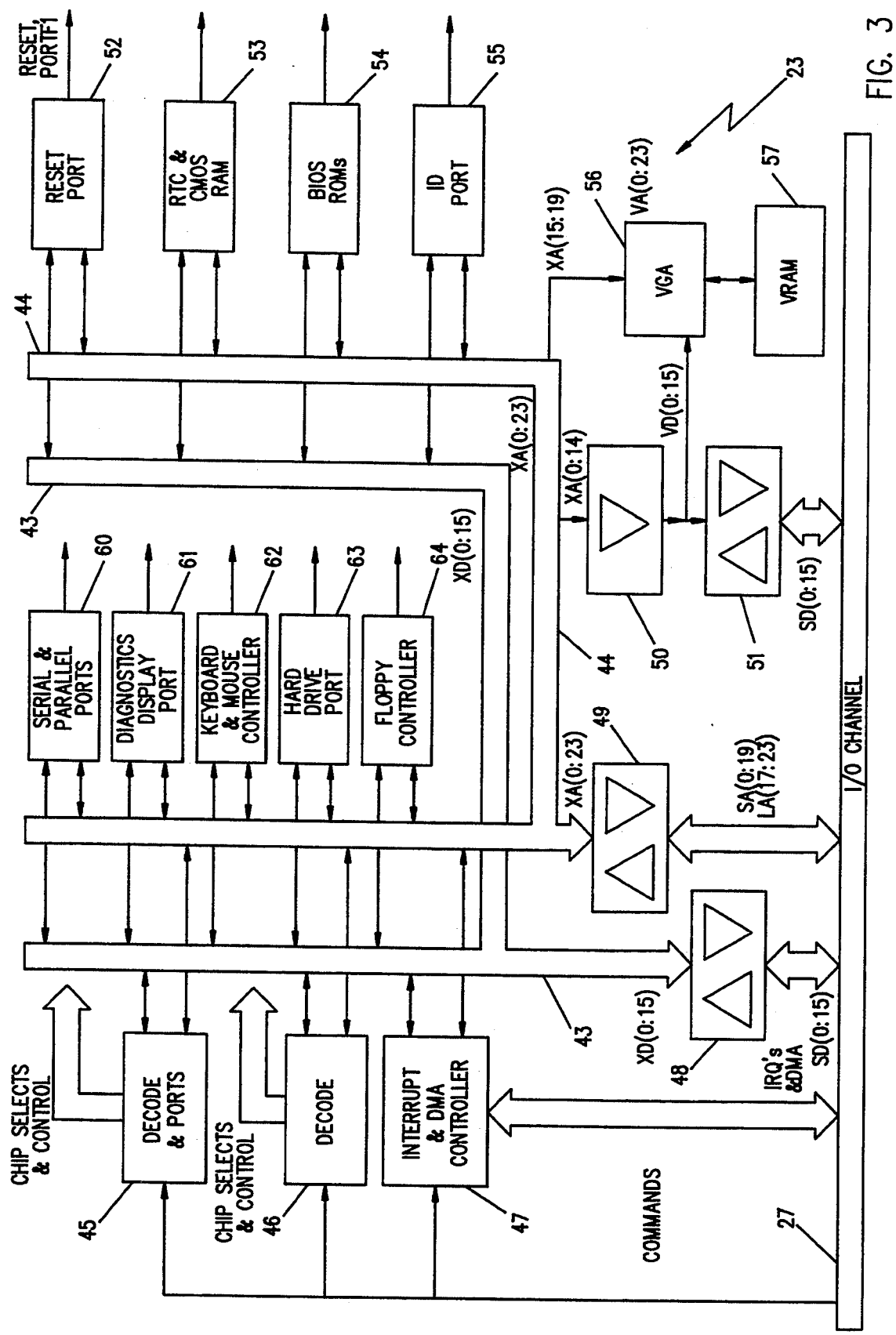
FIG. 3 is a block diagram of the input/output section of the computer system of FIG. 1.

FIG. 3 is a block diagram of the input/output 23 of the system of FIG. 1. As illustrated in FIG. 1, I/O channel 27 is the communication link between the multiple processors and the various input/output devices shown in FIG. 3, including decoders 45 and 46 and an interrupt and DMA controller 47. The input/output devices 52–57 and 60–64 are all controlled by way of the I/O channel 27 through bi-directional drivers 48 and 49. VGA 56 is a video graphics adapter for producing images on a system monitor under control of data stored in VRAM 57. The assembling and queuing of digital words is arranged so that the peripheral devices shown made be written to from the store queue.

Figure 4:
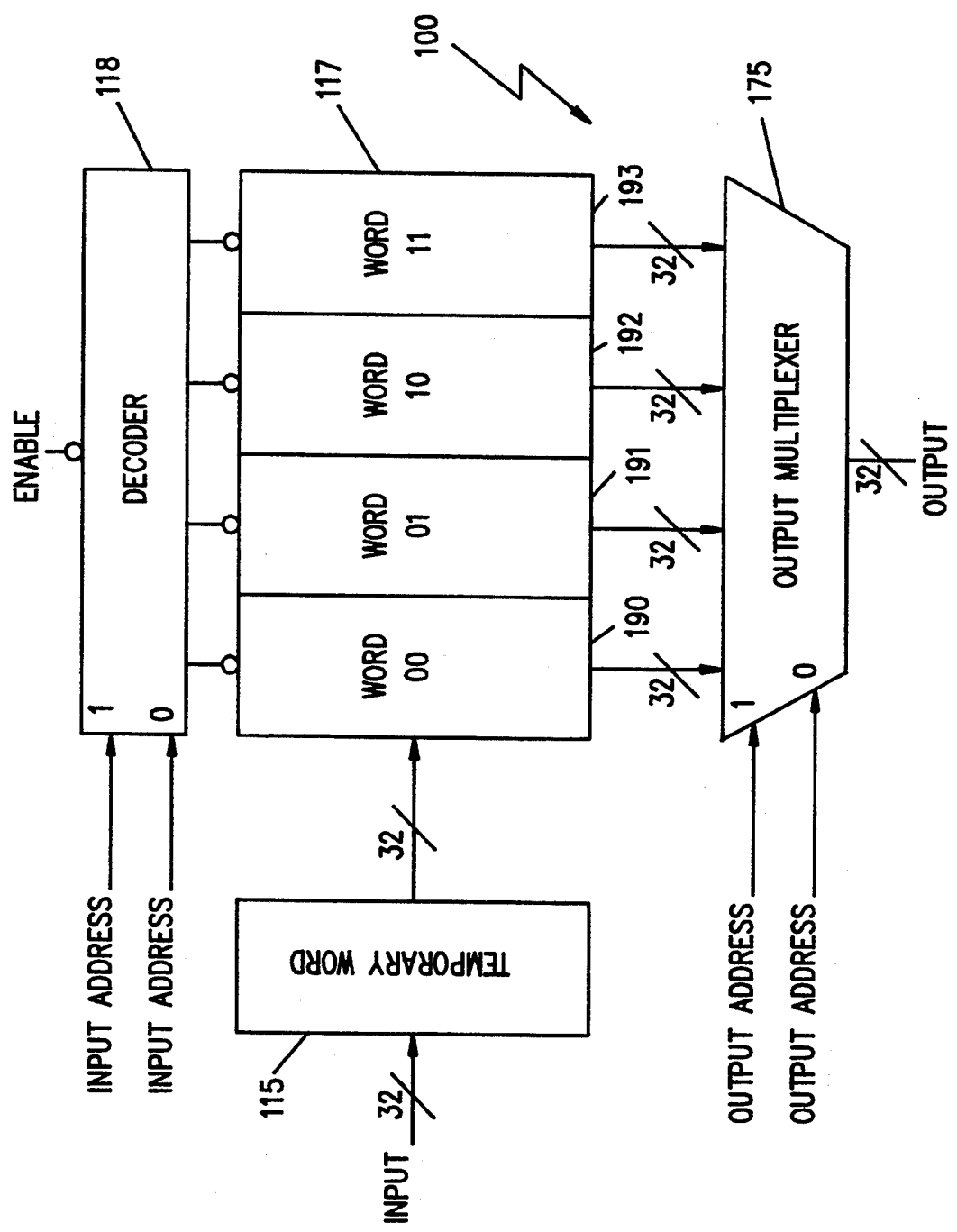
FIG. 4 is a descriptive block diagram of the data word store queue of this invention.

FIG. 4 is a block diagram 100 which illustrates the structure of the store queue mechanism of this invention, in simple form. While the structure shown is for data, it is essentially identical to the structure used for the address of the data as well, and is similar to the structures used for the byte enables. The input data word is entered into the temporary word register 115. The microprocessor identified above uses a technique known as "posted writes" in its cache controller circuitry for storing data, address and byte enable in a temporary word register so that the processor and cache can proceed with the next task. The word to be written is then transferred to the data store queue in register 190, 191, 192 or 193 as determined by decoder 118, which has an enable input and a queue address input. Output multiplexer 175 selectively outputs the contents of word 00–word 11. The output from output multiplexer 175 is entered into the storage device of choice.

Figure 5:
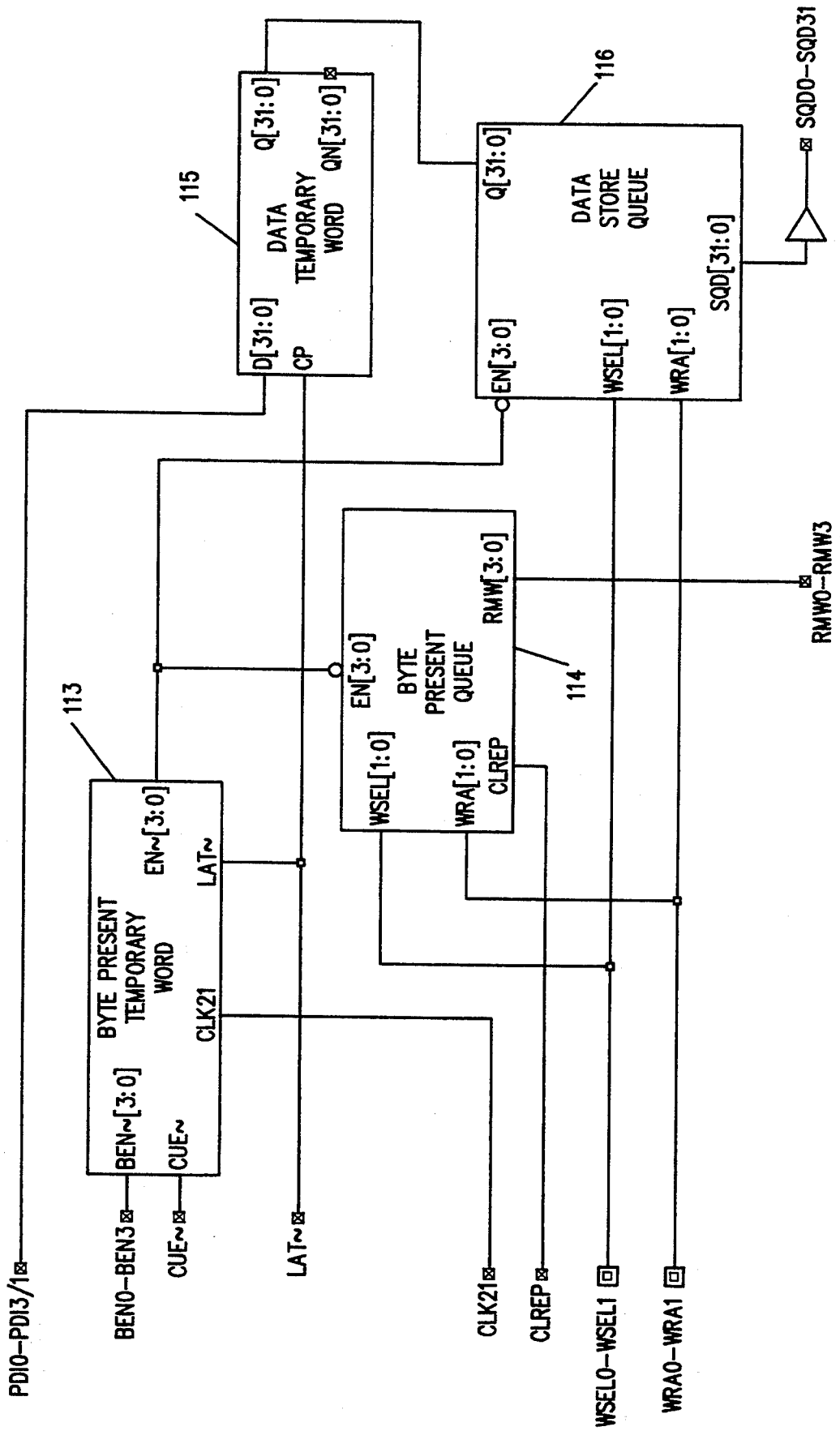
FIG. 5 is more generalized block diagram of the data word store queue of this invention.

Turning now to FIG. 5, a block diagram is shown which includes byte present queue 114, data temporary word 115 and data store queue 116, which includes as storage 117, decoder 118 and output multiplexer 175 as shown in FIG. 4. Byte present temporary word 113 is also shown.

Figure 6:
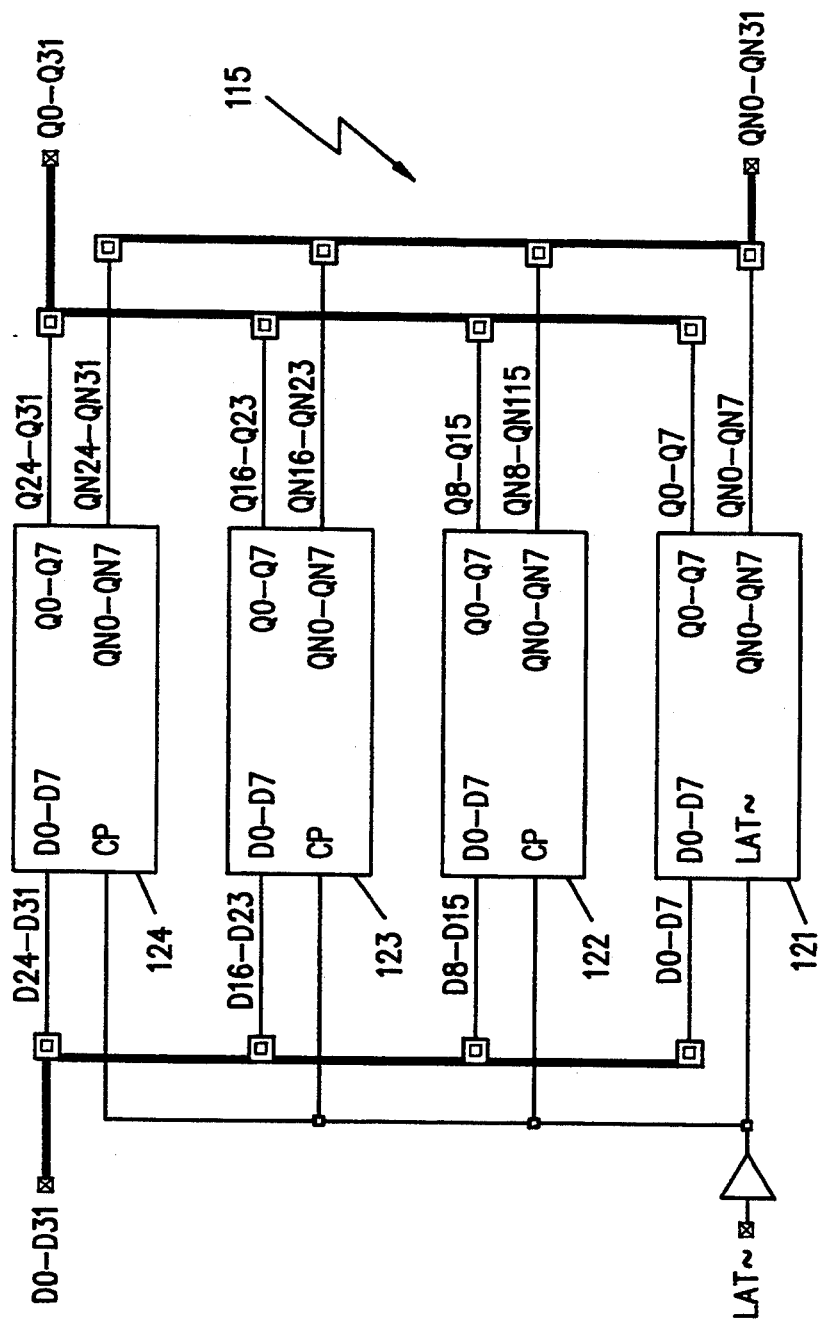
FIG. 6 is a block diagram of the data temporary word store 115 of FIG. 5.
Figure 35A:
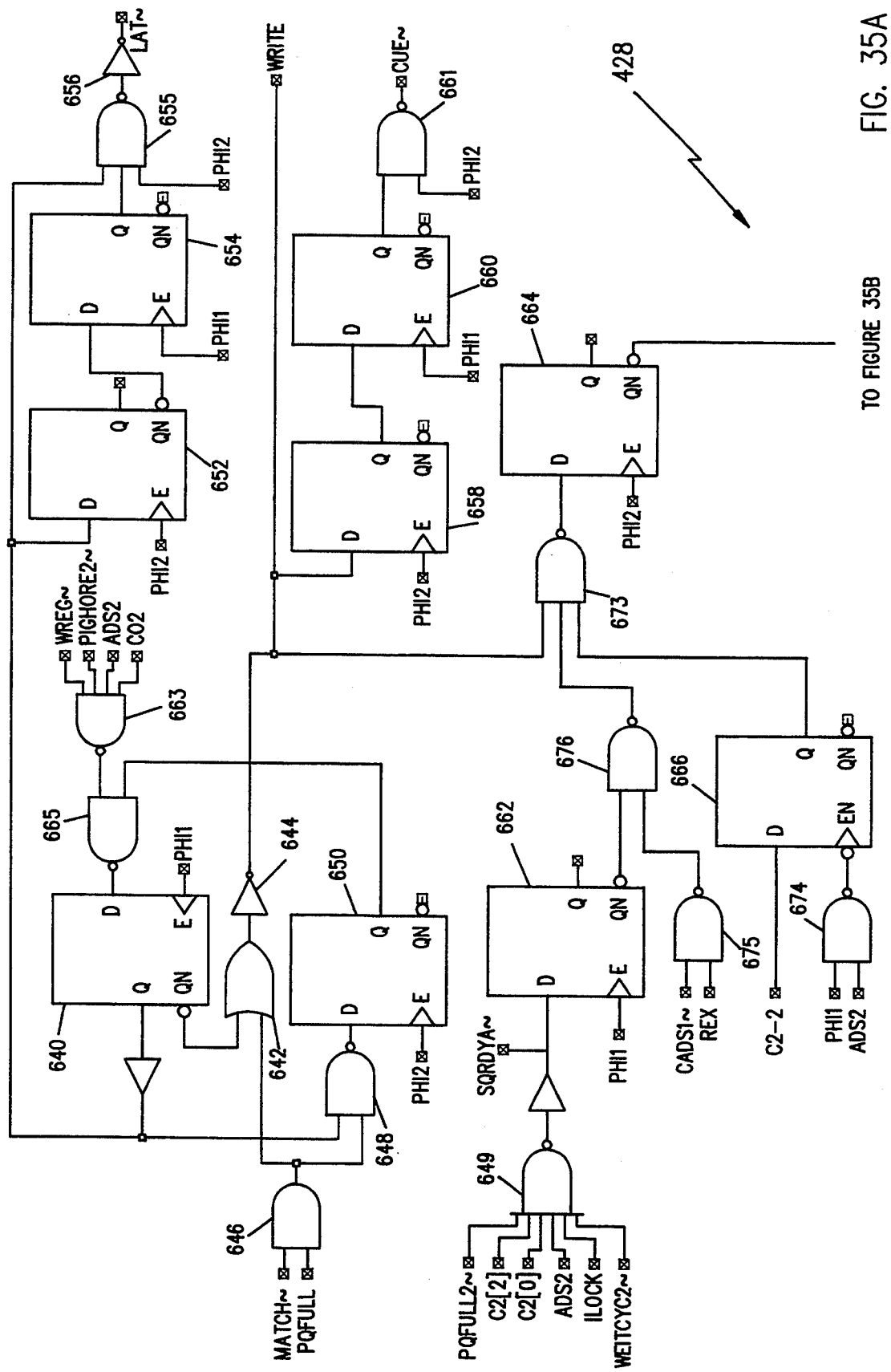
FIGS. 35A and 35B are a schematic diagram of control 428 of FIG. 14.
Figure 35B:
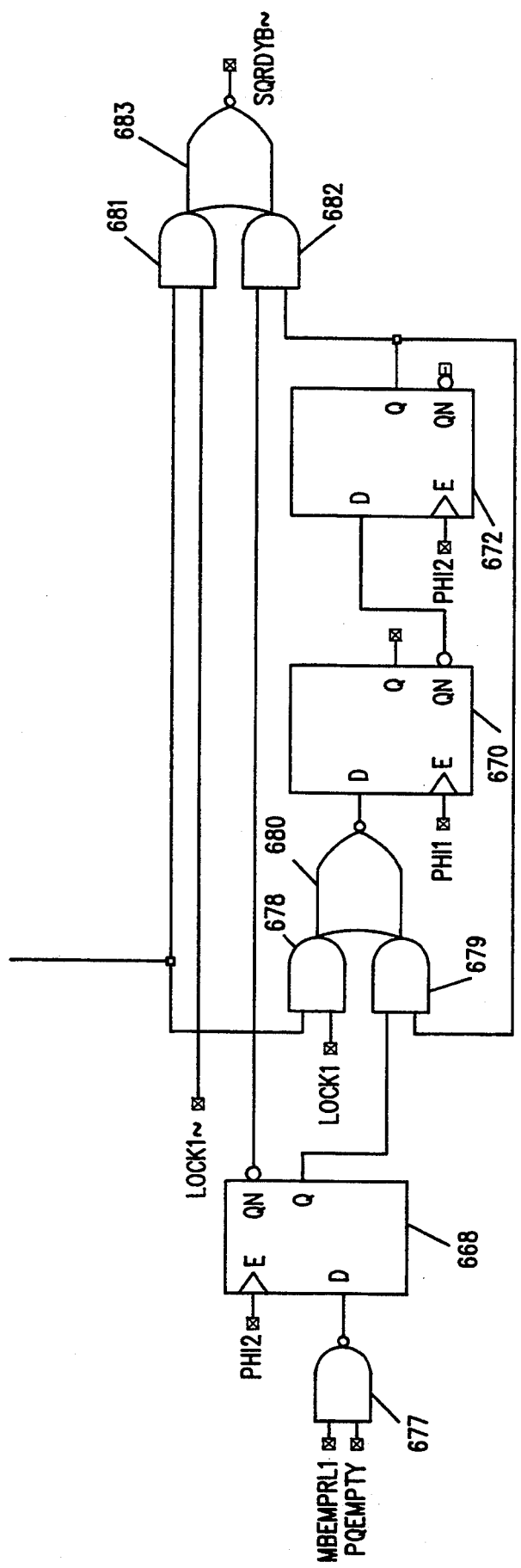

FIG. 6 is a block diagram of data temporary word register 115, from both FIGS. 4 and 5. Data bits D0–D31 are input to the system, with D0–D7(byte 0), D8–D15(byte 1), D16–D23(byte 2), and D24–D31(byte 3) being input to 8-bit flip-flops 121–124, respectively. Signal LAT∼ from write controller 428 shown in FIG. 35 is applied to the inputs of the flip-flops as well.

Figure 7:
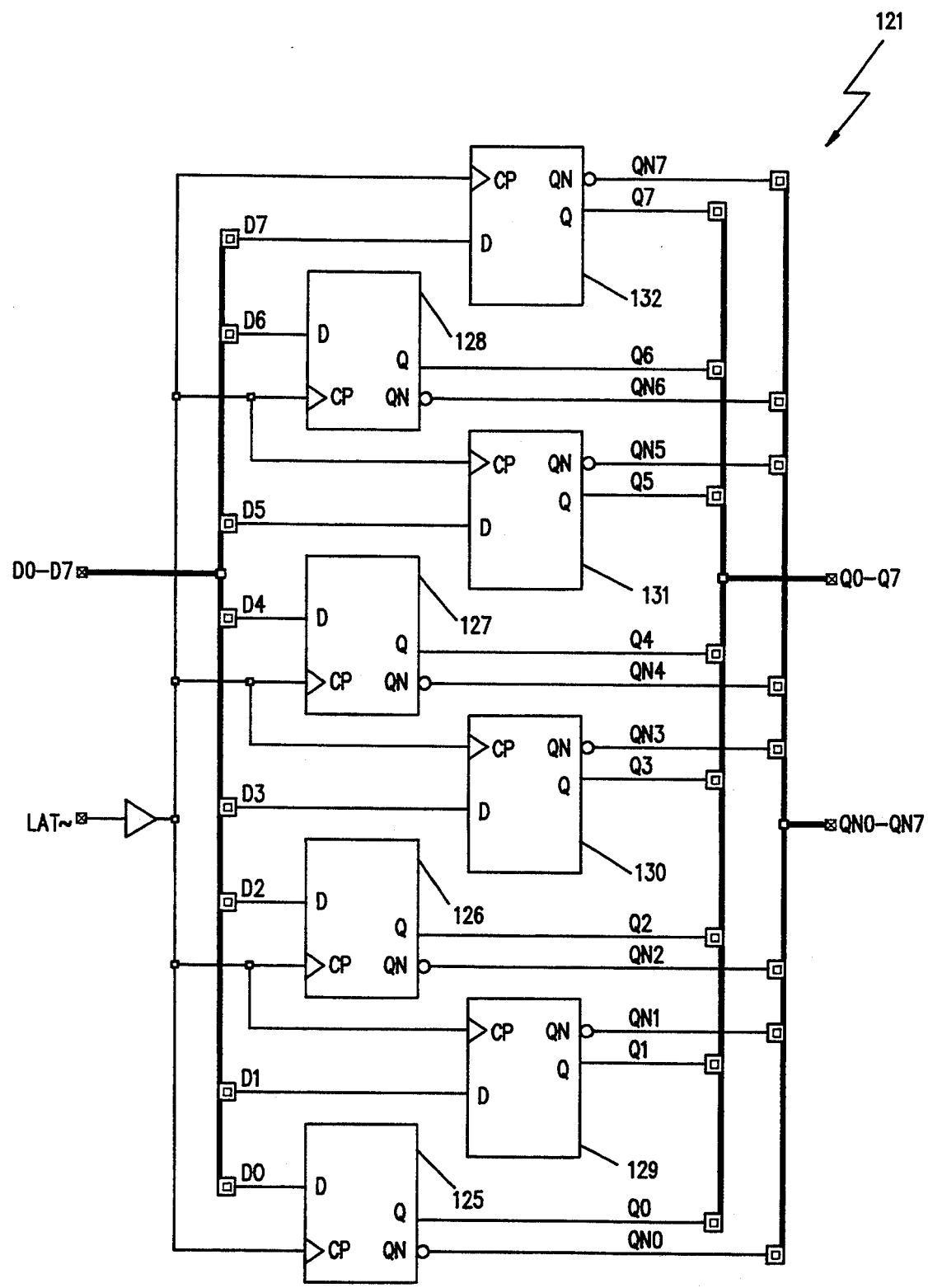
FIG. 7 is a schematic diagram of section 121 of FIG. 6.

FIG. 7 is a schematic diagram of one set of 8 flip-flops shown in block 121 of FIG. 6. Data bits D0–D7(byte 0) are applied to the D inputs of each of flip-flops 125–132. The signal LAT∼ is applied to the CP input of each of these flip-flops. The Q output of each flip-flop is bussed together to provide signals Q0–Q7. The QN outputs together provide QN0–QN7.

FIG. 7 therefore simply illustrates the lower order 8 flip-flops for storing data bits D0 through D7. Flip-flop units 122–124 shown in FIG. 6 are identical to the schematic shown in FIG. 7 except that data bytes 1, 2 and 3 are stored in units 122, 123, 124, respectively.

Figure 8:
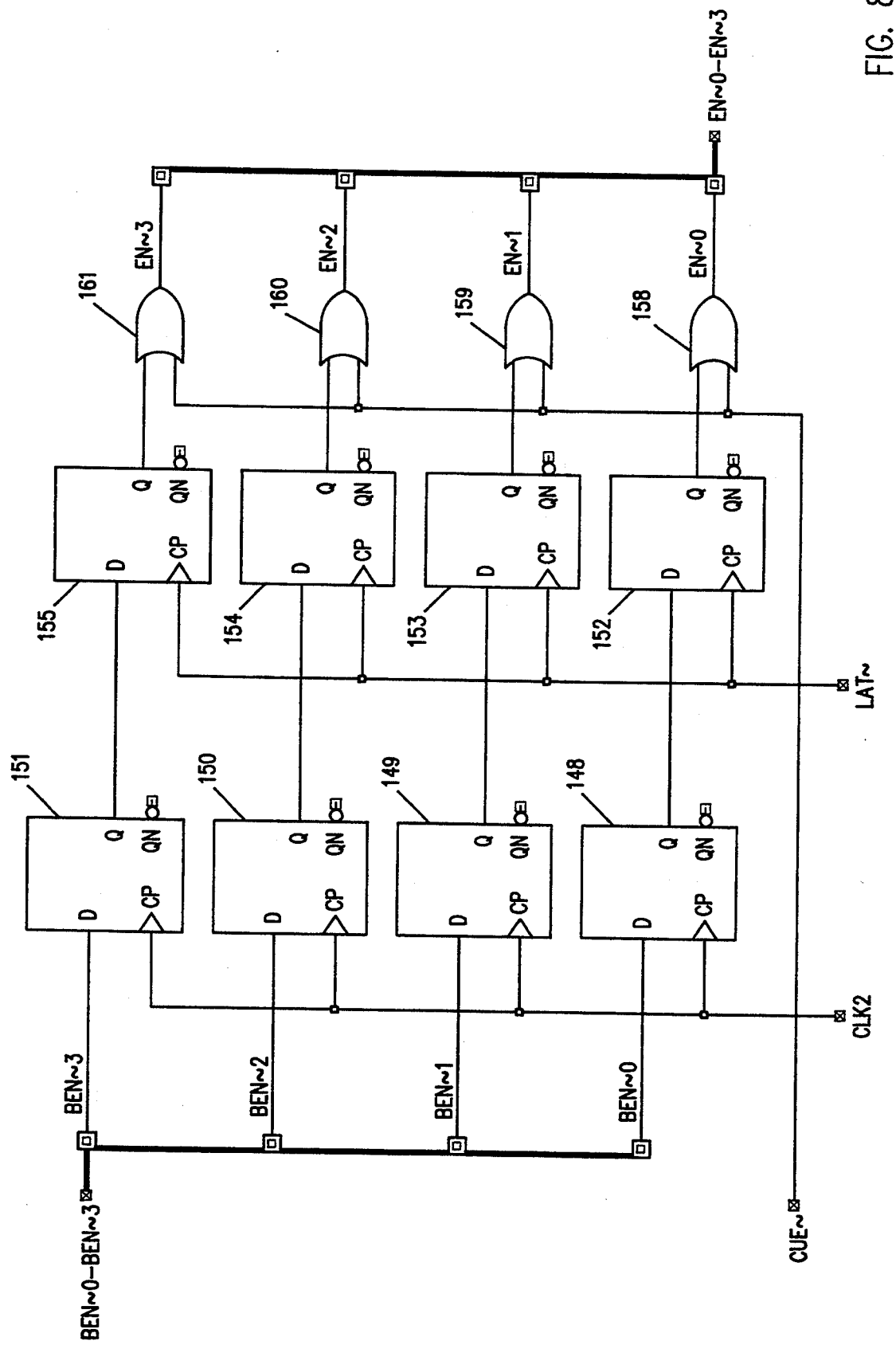
FIG. 8 is a schematic diagram of the byte present temporary word 113 of FIG. 5.

FIG. 8 is a schematic diagram of the byte enable timing and latching 113 of FIG. 5. Signals BEN0∼--BEN3∼ are applied to the D inputs of flip-flops 148–151, respectively. Those flip-flops are timed by system clock CLK 2 (from which the half frequency PHI1 is derived)to synchronize the byte enable signals BEN0∼--BEN3∼ with the data signals D0–D31, previously discussed. Microprocessor 30 (of processor 11) sends the BEN0∼--BEN3∼ signals out with the address information which is one CLK 2 prior to the data being sent out. Flip-flops 152–155 have the Q outputs of flip-flops 148–151 applied to their D inputs, respectively. The byte enable information is stored as a "posted write" in flip-flops 152–155 in the same manner as the data word posted write mentioned earlier. Flip-flops 152–155 are clocked by signal LAT∼, the same signal that clocks the data. OR gates 158–161 each receive the Q output from flip-flops 152–155 respectively. The other input to each of gates 158–161 is signal CUE∼ which is originated in controller 428 of FIG. 35 and conditions the entry of data as described later. Signal CUE∼ gates the Q output of each of flip-flops 152–155 through gates 158–161 to form signals EN0∼ through EN3∼ which serve to selectively queue the existing byte presents in the temporary word 113 into the byte present queue 114. These output signals have been timed by circuit 113 to correspond to the timing of the data signals that entered temporary word 155. Note that signal LAT~ clocks all of the flip-flops in FIG. 15 and flip-flops 152-155 of FIG. 8.

Figure 9:
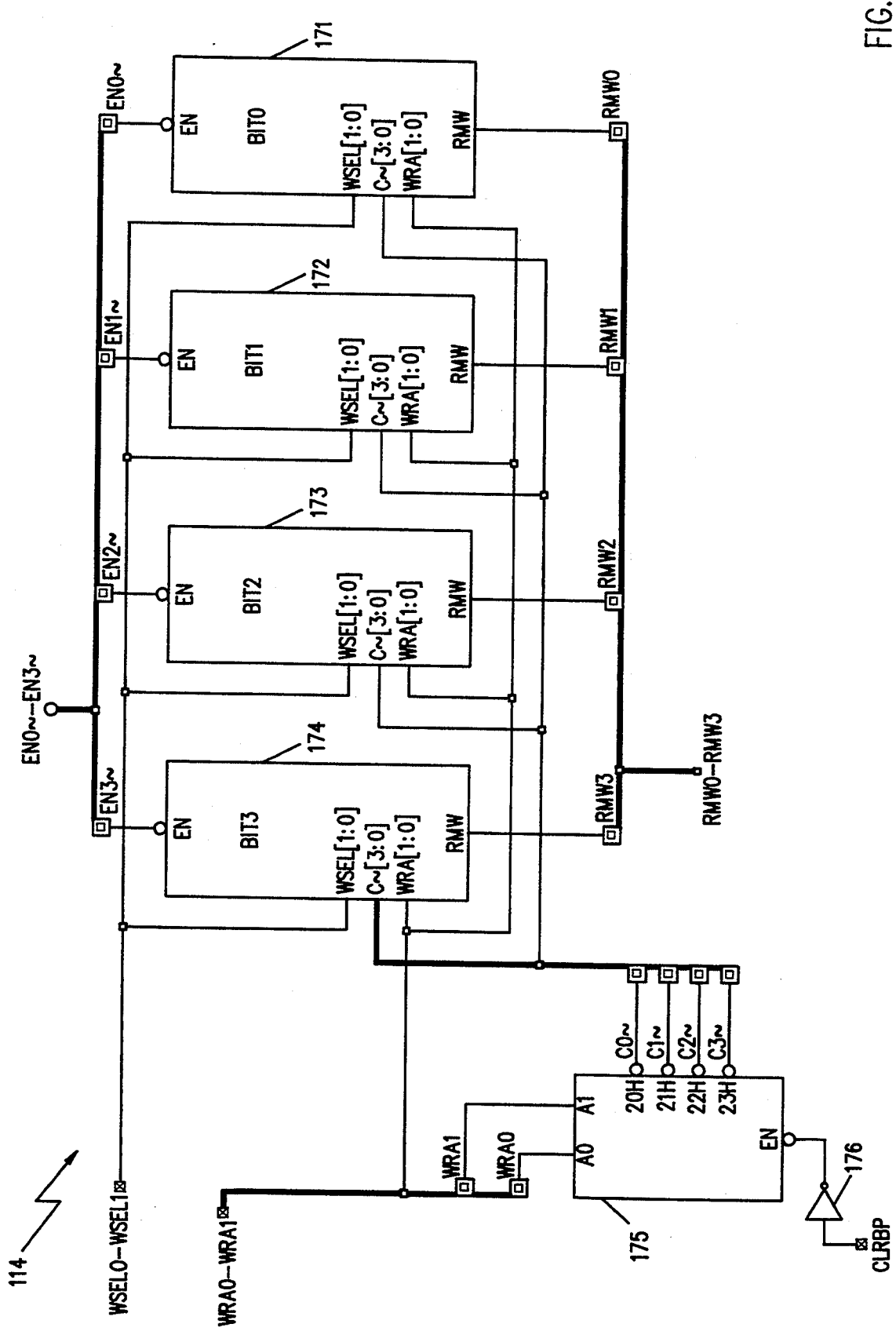
FIG. 9 is a block diagram of byte present queue of 114 of FIG. 4.

FIG. 9 illustrates the signals EN0~-EN3~ applied as enabling signals to the byte present latches 171-174, respectively. Input signals WSEL0-WSEL1 WRA0-WRA1 and CLRBP all ultimately originate in the store queue address control 425 of FIG. 29. Signals WSEL0 and WSEL1 address the byte present queue 114 for enqueuing (writing) entries. Signals WRA0-WRA1 address the byte present latches for dequeuing (reading) entries out of the queue. Signal CLRBP enables decoder 175 to decode signals WRA0-WRA1 into C0~-C3~ for application to the latches units 171-174. Signals RMW0-RMW3 are output from latches 171-174, respectively and are read-modify-write signals for controlling the read-modify-write operation required when, an Error Correction Code (ECC) System is in place. To write one or more bytes requires the retrieval of the entire word from memory, replacement by new data, calculation of the ECC syndrome and writing the revised data and the ECC syndrome into the memory. When all four bytes are present, there is no need for the read-modify-write operation. The write and syndrome calculations are done directly.

Figure 10:
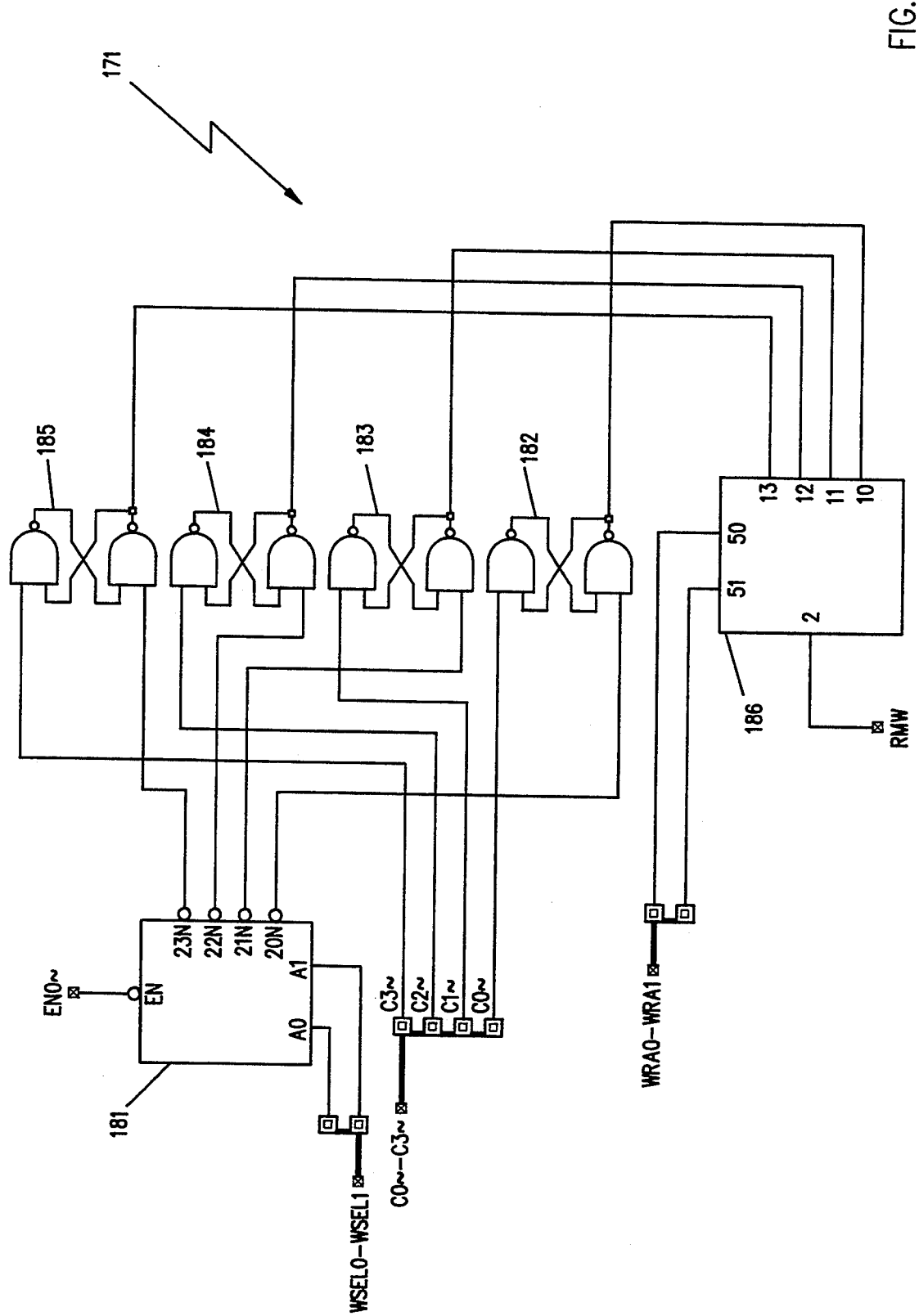
FIG. 10 is a schematic diagram of section 171 of FIG. 9.

FIG. 10 schematically illustrates latch unit 171 which is identical to latch units 172-174. Decoder 181 receives the signals WSEL0 and WSEL1, and outputs the decoded result, conditional on the byte enable signal, EN0~, on terminals Z0N-Z3N which are applied to one NAND gate in each of cross coupled NAND gates 182-185. Signals C0~-C3~ are applied to the inputs of the other NAND gates in the cross coupled NAND gates 182-185, respectively. Signals WRA0 and WRA1 control decoder 186 which receives the outputs from the cross coupled NAND gates 182-185. The C0~-C3~ signals clear this segment present file when the element selected by signals WSEL0 and WSEL1 is removed from the file.

Figure 11:
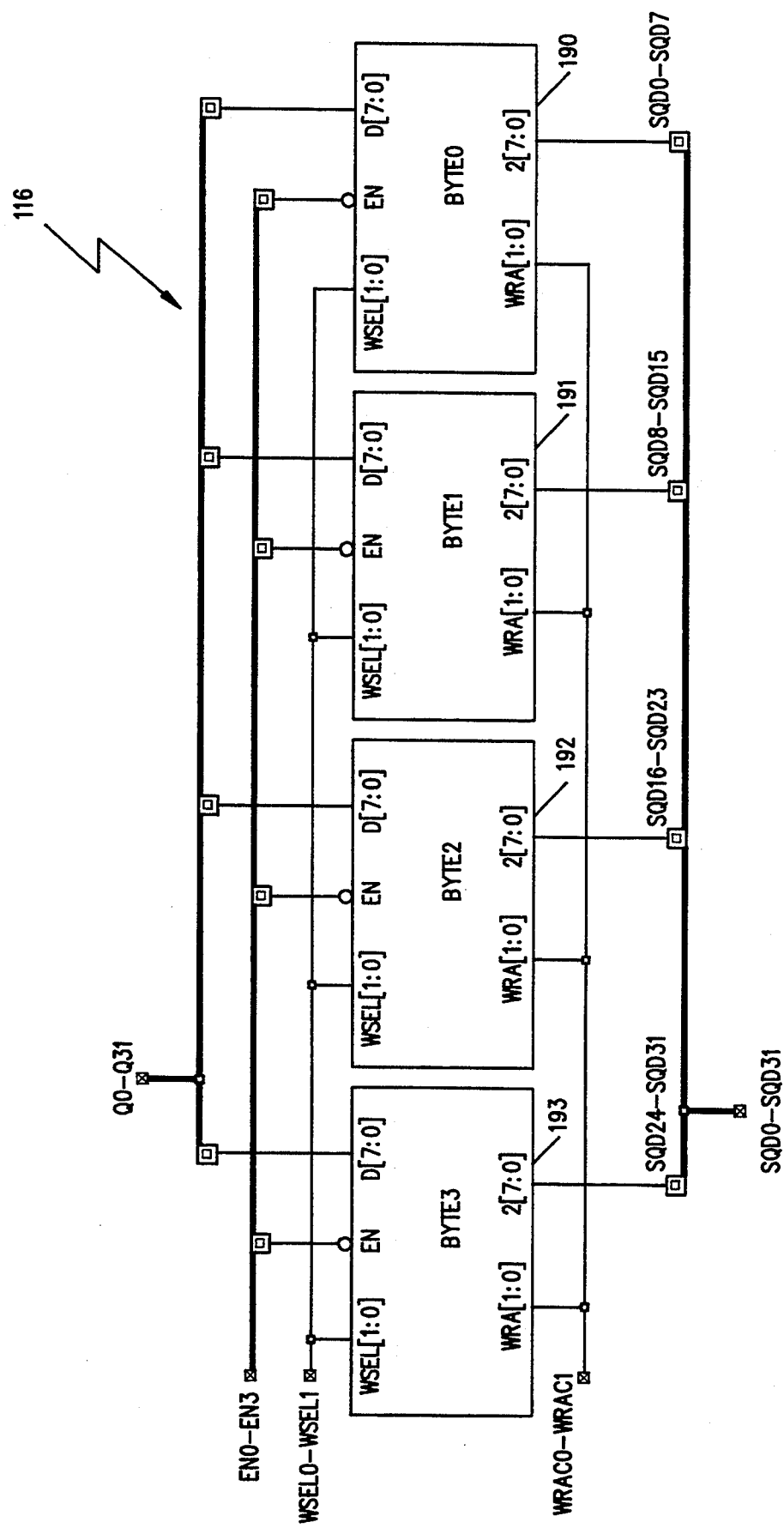
FIG. 11 is a block diagram of data store queue 116 of FIG. 5.

Data store queue 116 in FIG. 11 simply illustrates the store queue 116 divided into four bytes and, further, into a four word store. The output of temporary word 115, bits Q0-Q31 are shown as input to store queue 116, along with signals WSEL0 and WSEL1, and the enable signals EN0~-EN3~. Output signals SQD0-SQD31 are shown exiting store queue 116.

Figure 12:
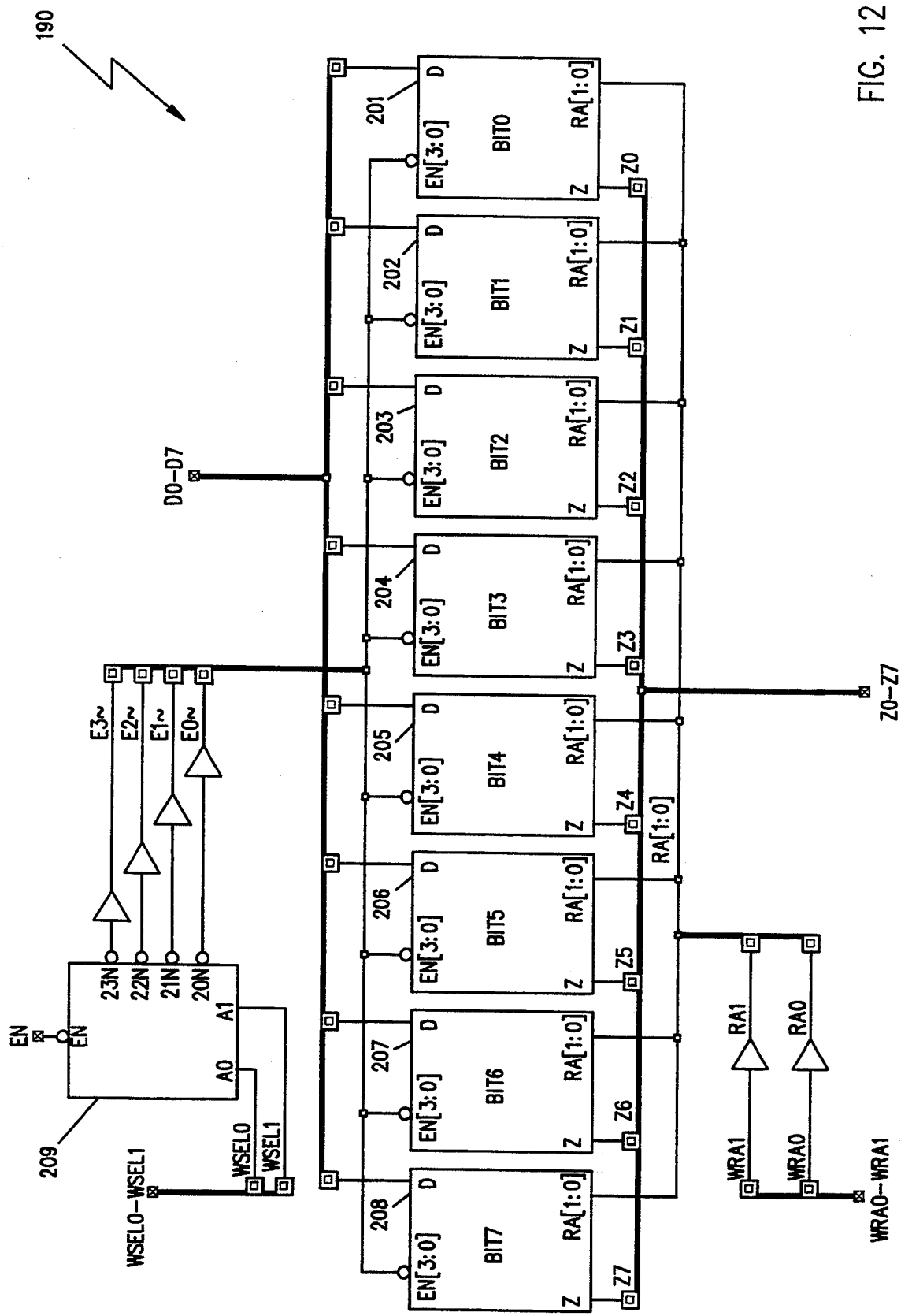
FIG. 12 is a block diagram of section 190 of FIG. 11.

FIG. 12 illustrates block 190 of FIG. 11 in more detail. Block 190 is identical to blocks 191-193. Eight bit positions 201-208 are shown. The decoder 209, which receives signal WSEL0 and WSEL1 selects to which word information is being written, conditional on the temporary word byte present signals, EN0~-EN3~. Signals WRA0 and WRA1 control which words are being read.

Figure 13:
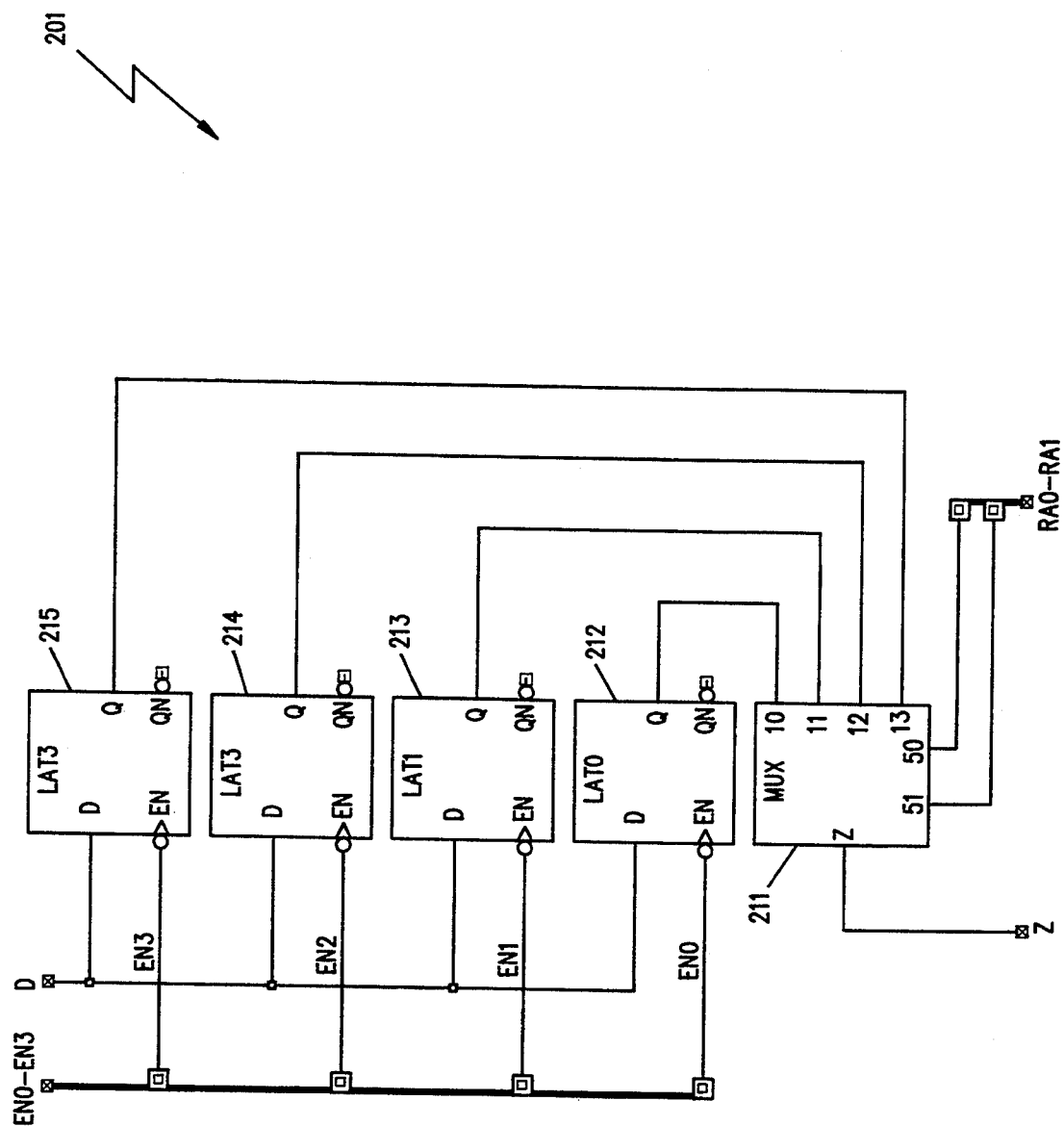
FIG. 13 is a schematic diagram of a section 201 of FIG. 12.

FIG. 13 is a schematic diagram of block 201, representing bit 0, from FIG. 12. Latches 212-215 are ordinary D latches with low true clock. The multiplexer 211 is controlled by lines RA0 and RA1 which are buffered versions of lines WRA0 and WRA1. Multiplexer 211 selects which of the four words in the queue is active for reading. The latches 212-215 are enabled by signals EN0~-EN3~, outputs of decoder 209 (FIG. 12) to select which of the four words in the queue is active for writing.

Figure 14A:
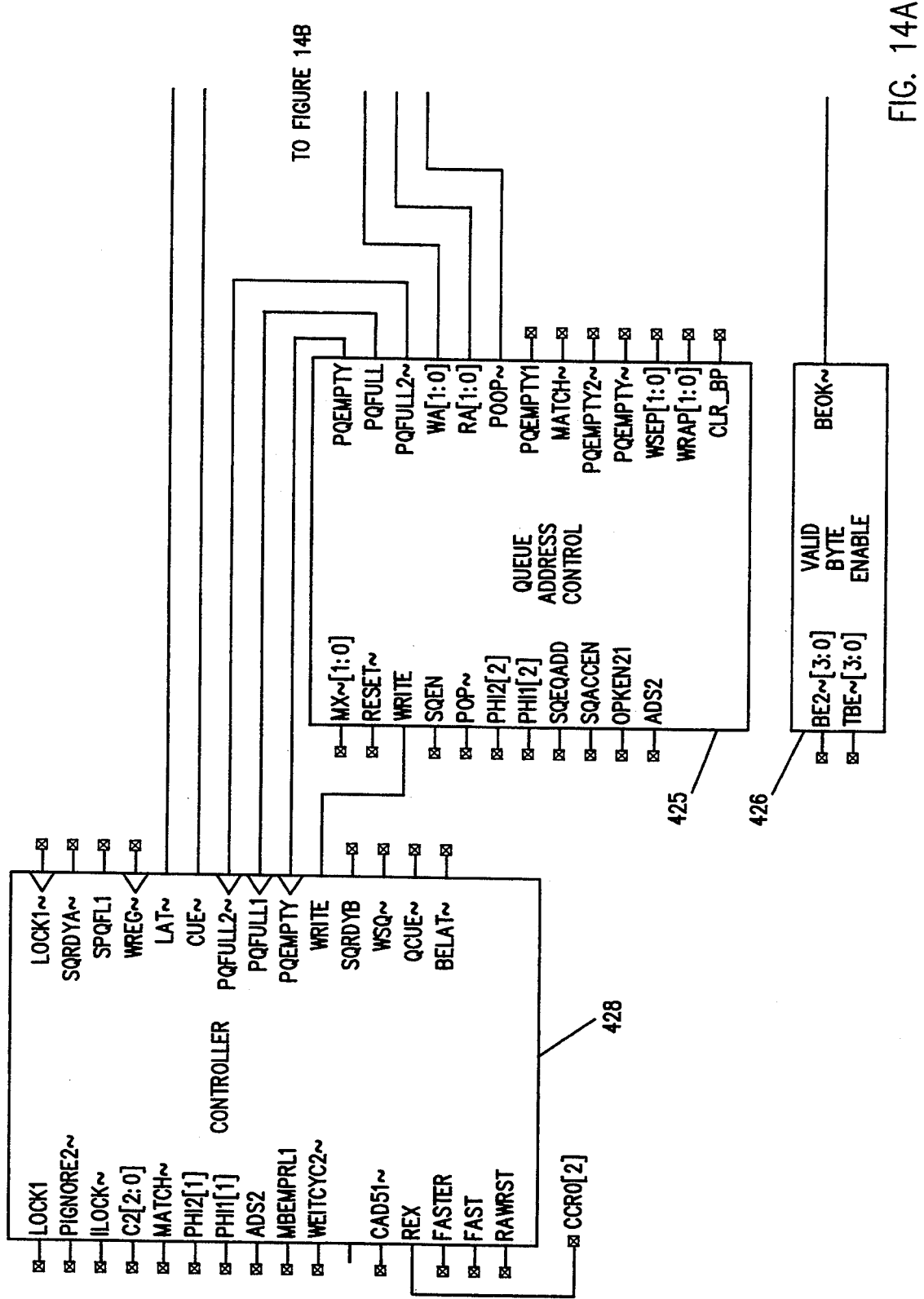
FIGS. 14A and 14B are a block diagram of the address and byte present store queue and control.
Figure 14B:
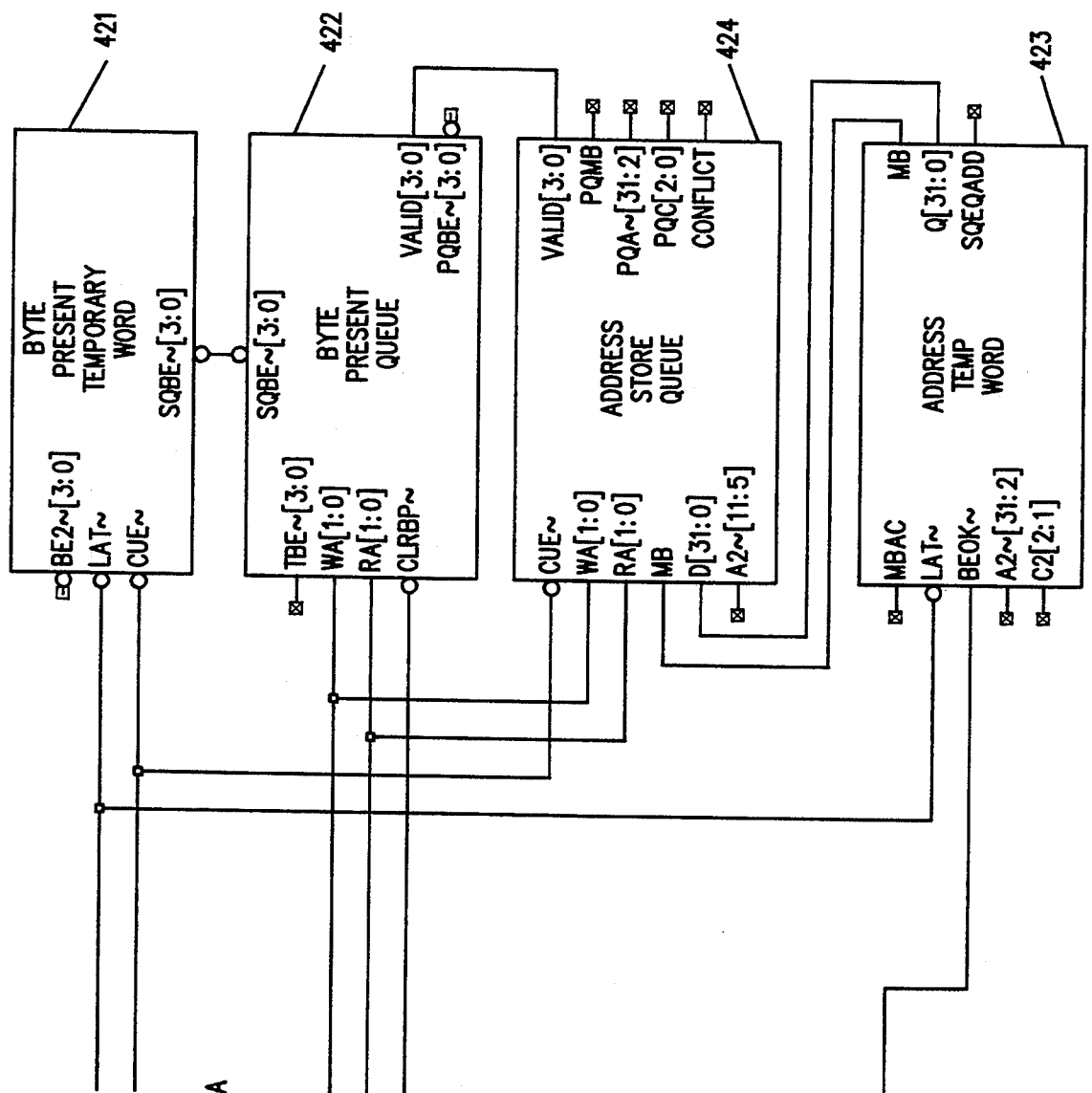

FIG. 14 illustrates, in block form, address temporary word 423, address store queue 424, byte present temporary word 421, byte present queue 422, valid byte enable 426, queue address control 425, and general control 428.

Control 428 is shown with outputs connected to the inputs of queue address control 425, byte present temporary word 421, byte present queue 422, address temporary word 423, and address store queue 424. Valid byte generator 426 has an output connected to address temporary word 423.

Figure 15:
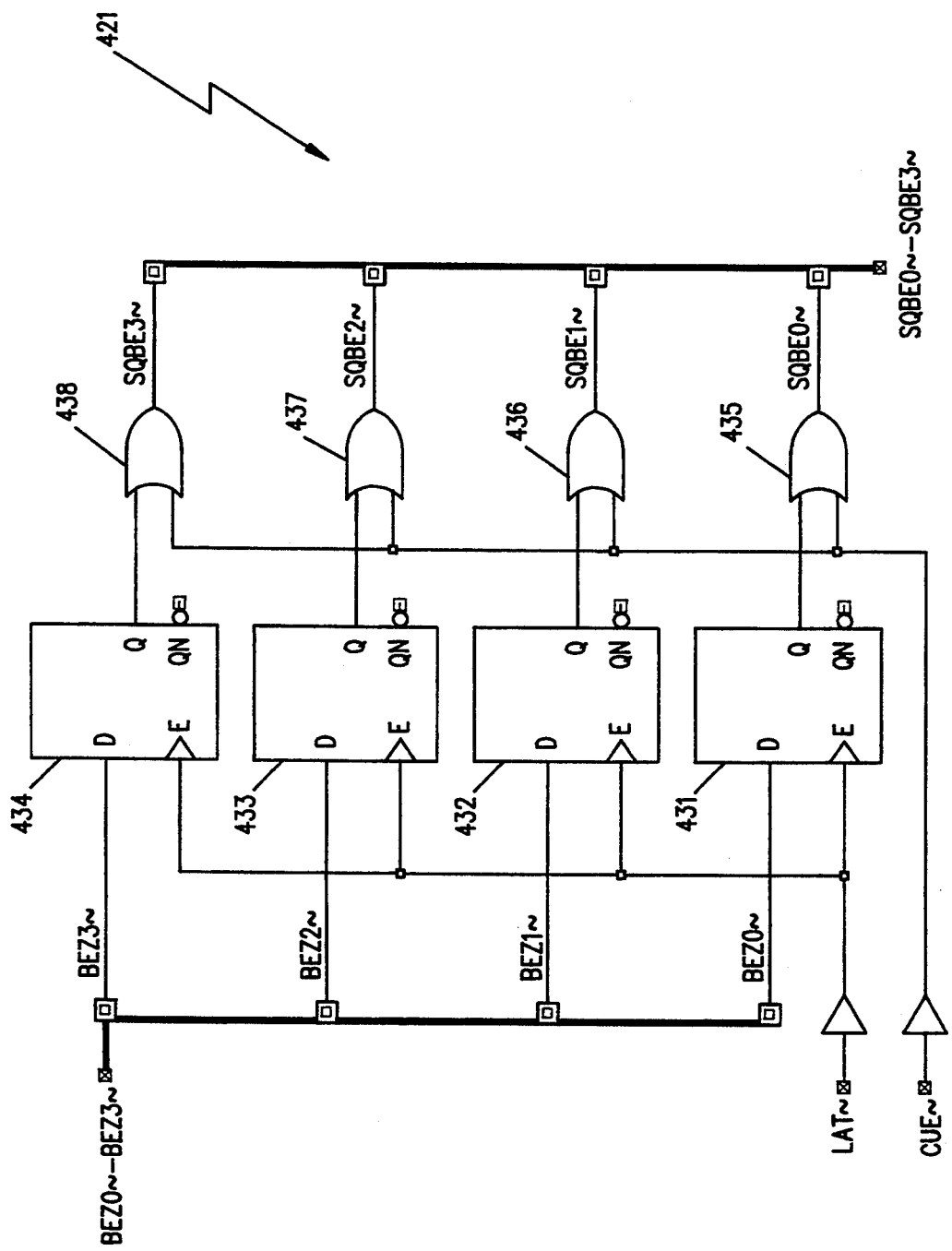
FIG. 15 is a schematic diagram of the byte temporary word 421 of FIG. 14.

FIG. 15 schematically details byte present temporary word 421. Note that the schematic is similar to FIG. 8 except that the timing adjustment shown in FIG. 8 is not required. Byte enable signals BEZ0~-BEZ3~ come from the processor 11 and are applied to the D inputs of latches 431-434, respectively. Signal LAT~ is applied to the E input of each of the latches. Signal CUE~ is applied to one input of each of OR gates 435-438, respectively. The Q output of each of latches 431-434 is applied to the other input of OR gates 435-438, respectively. These OR gates (low true input NAND gates) provide output signals SQBE0~-SQBE3~, respectively.

Figure 16:
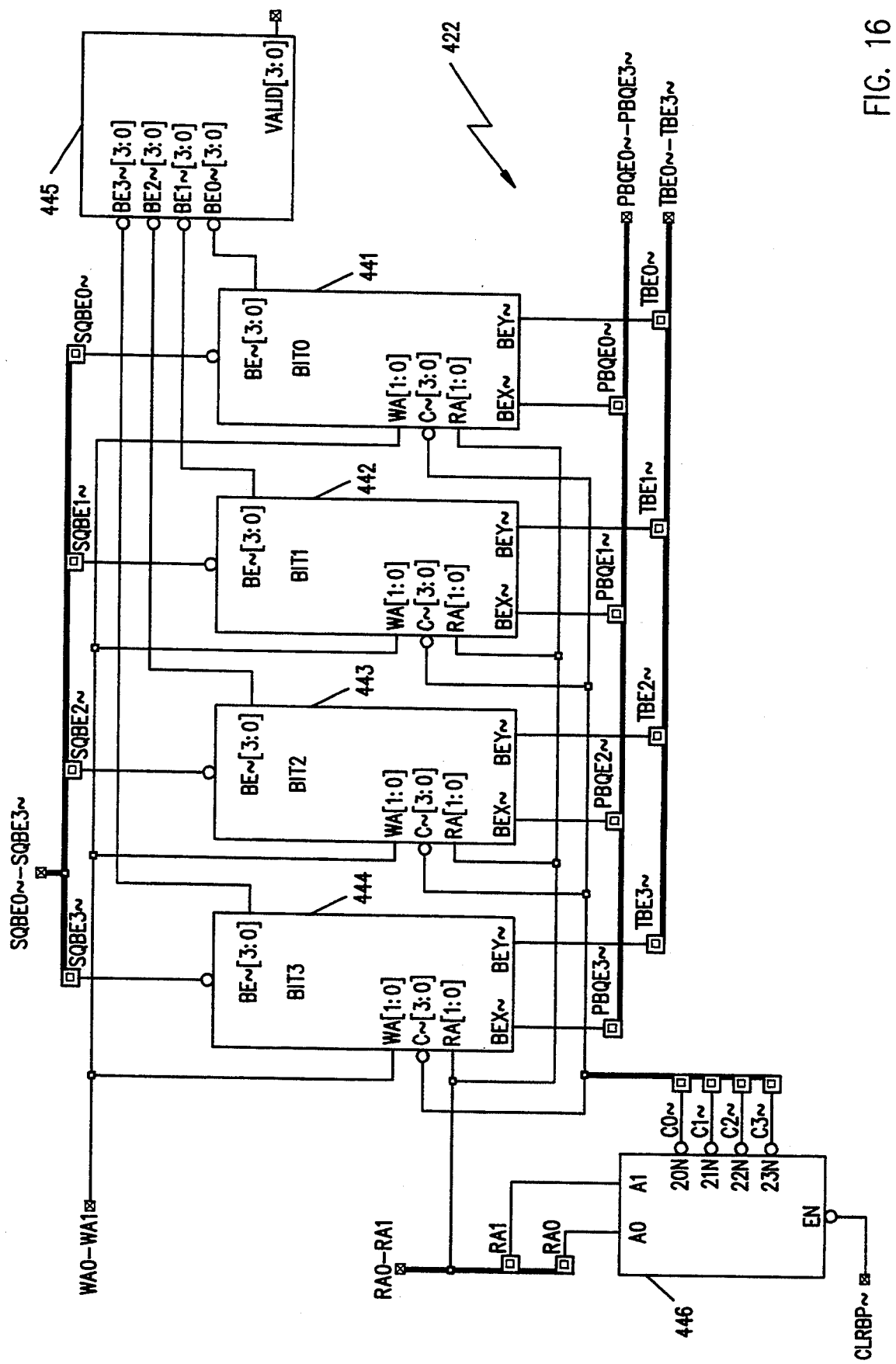
FIG. 16 is a block diagram of the byte present queue 422 of FIG. 14.

FIG. 16 illustrates the byte present queue 422 organization. Note that FIG. 16 is similar to FIG. 9 except that block 445 is included in FIG. 16 and is used for determining whether a given word contains valid information. A 2 to 4 decoder 446 is used to determine which entry is actively being read from the queue. At the end of a read cycle, a signal CLBP~ (clear byte present) goes active low to cause the C0~-C3~ bus to select the entry to be cleared.

Figure 17:
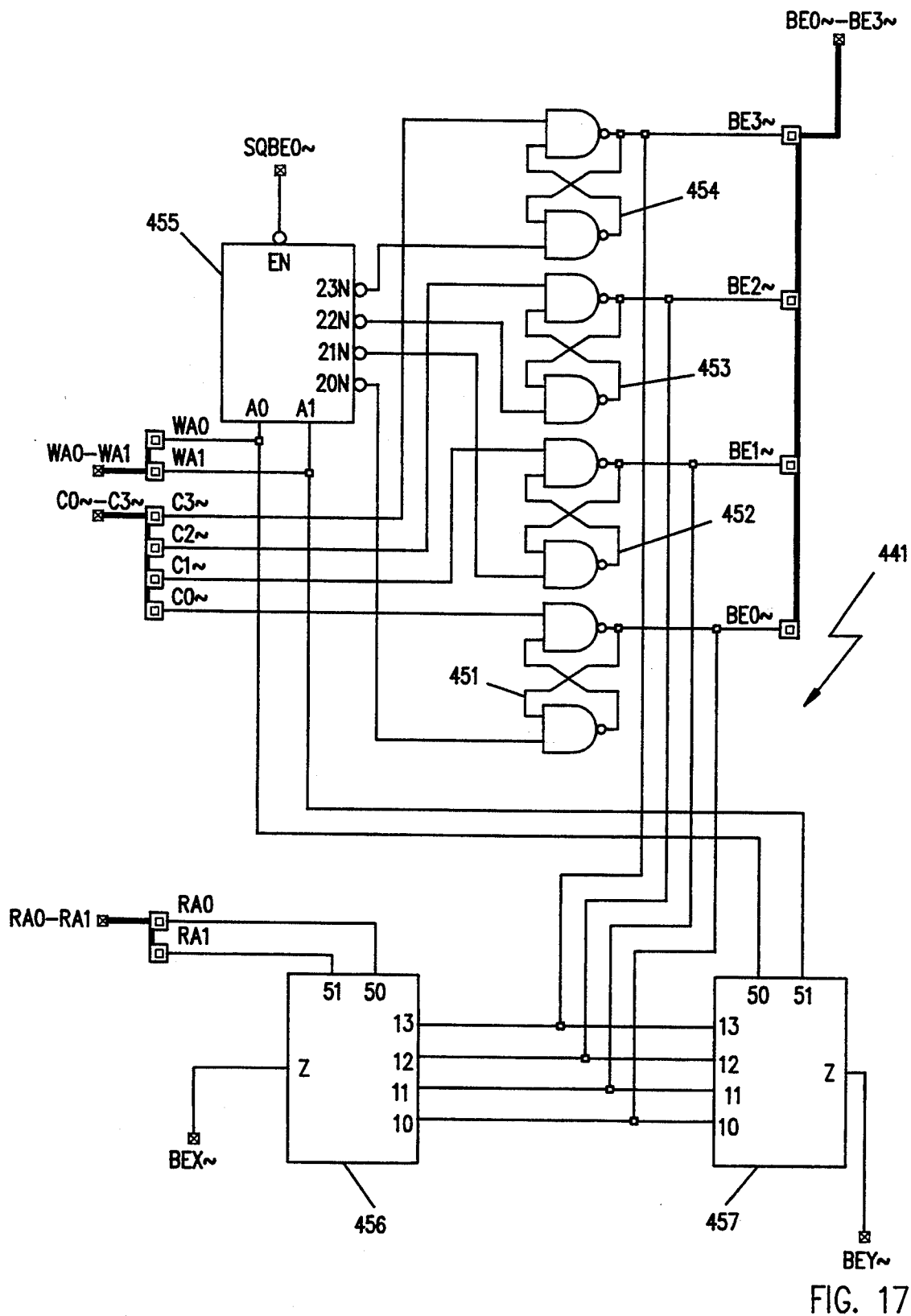
FIG. 17 is a schematic diagram of section 441 of FIG. 16.

To more fully understand byte enable accumulator 422, it is necessary to study specific circuits, starting with the schematic diagram of block 441 shown in FIG. 17. The schematic for block 441 is identical to the schematics for blocks 442-444, respectively. Note that FIG. 17 is quite similar to FIG. 10 and performs a similar function. The cross coupled NAND gate latches 451-454 are cleared after a read cycle by signals C0~-C3~, respectively. Decoder 455 decodes write signals WA0 and WA1 which are enabled by signal SQBE0~ from FIG. 15. Read signals RA0-RA1 select which of the latches 451-454 are to be read through multiplexer 456, that is, BEX~ output signals PBQE0~-PBQE3~. Multiplexer 457 is decoded by write signals WA0 and WA1 to provide BEY~ output signals TBE0~-TBE3~. The outputs from each of the latches 451-454 are BE0~-BE3~, respectively.

Figure 18:
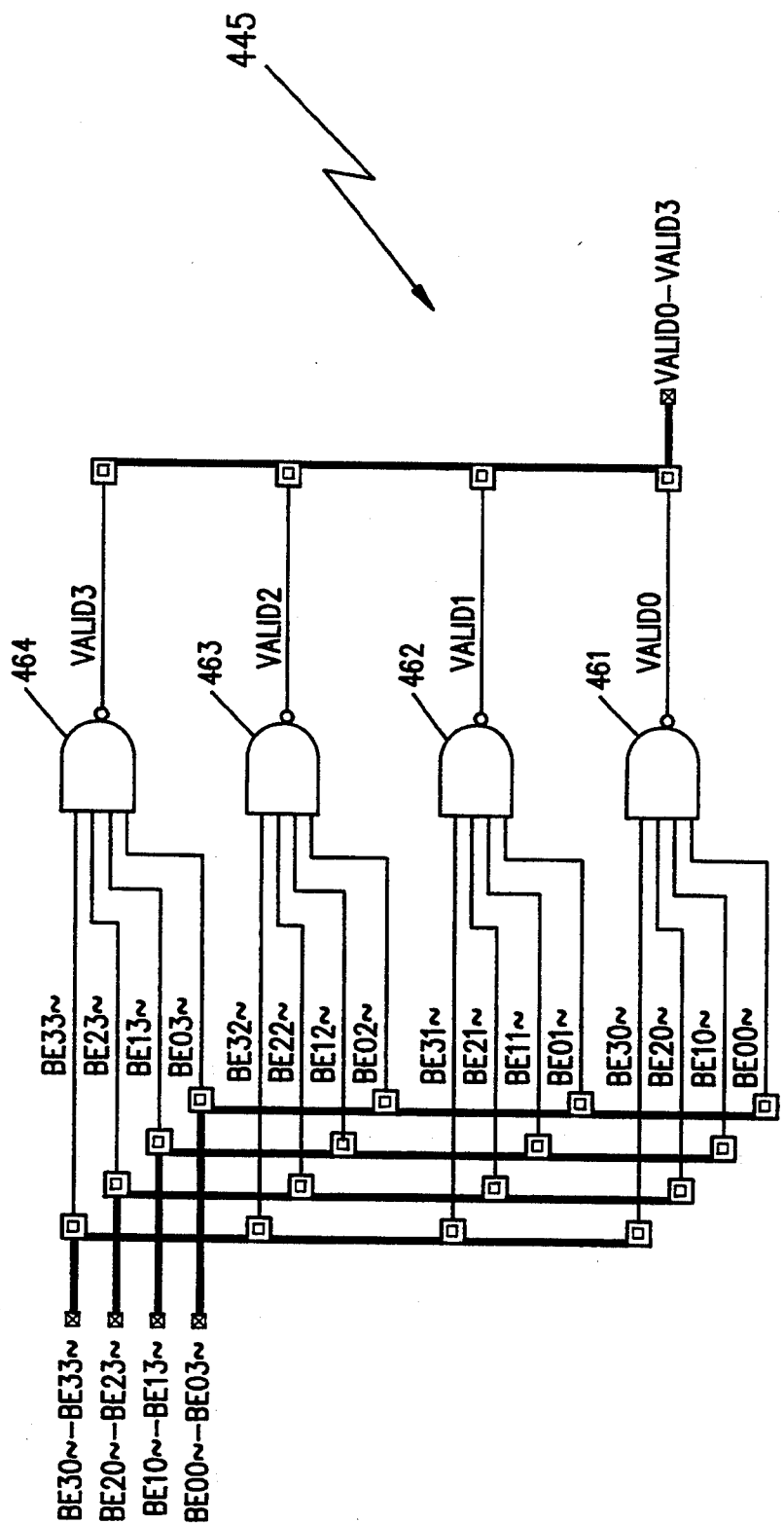
FIG. 18 is a schematic diagram of the valid entry section 445 of FIG. 16.

FIG. 18 illustrates block 445 from FIG. 16, for determining valid queue entries. NAND gates 461-464 function as low true input OR gates. The byte enable signals from block 441 as shown in FIG. 17, now designated BE00~-BE03~, and from blocks 442-444, are combined with each other as shown, as inputs to NAND gates 461-464 to determine whether the word contains an active entry which has not been written to memory. The circuitry simply ORs together byte enable information from each of the words and determines whether the entry is still valid. If an entry is clear as indicated by signals VALID0-VALID3 being low, then there is no need to compare addresses in the event of a memory read cycle by the processor 30, to avoid conflict by reason of the same address information being in the store queue as that of the processor.

Figure 19:
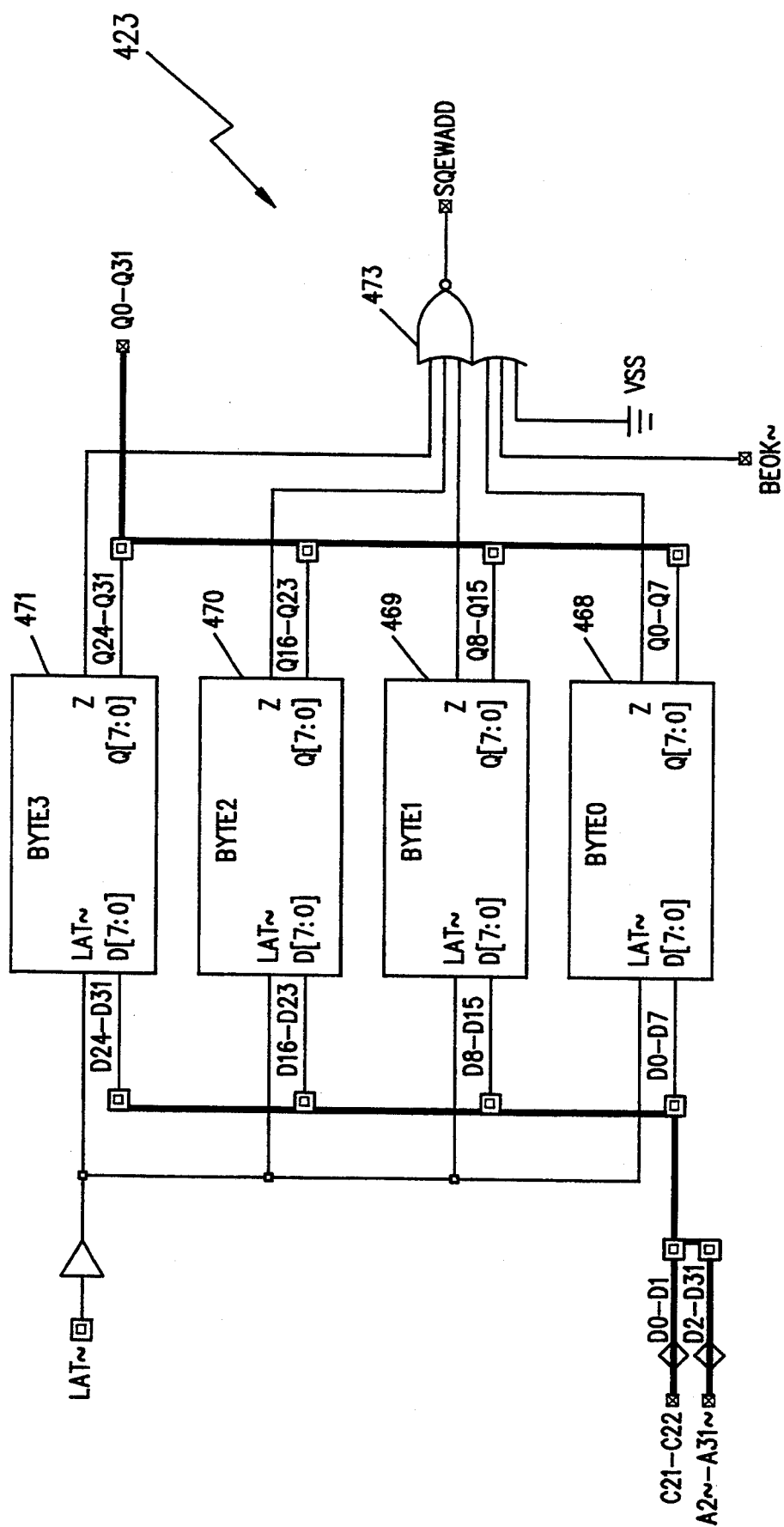
FIG. 19 is a block diagram of the address temporary word 423 of FIG. 14.

Address temporary word 423 is shown in FIG. 19. The address word is input as signals C21-C22 and A2~-A31~ which are redesignated as signals D0-D7 for application to block 468, D8-D15 for application to block 469, D16-D23 for application to block 470 and D24-D31 to block 471. Signal LAT~ is applied to each of blocks 468-471. The Z output from each of blocks 468-471 is input to NOR gate 473. Additionally, signal BEOK~ is applied as well. Signal BEOK~, as will be described later, is output from block 426 shown in FIG. 14 and will block the generation of signal SQEQADD output from NOR gate 473 if an illegal combination of bytes exists. Signal Q0-Q7, Q8-Q15, Q16-Q23, Q24-Q31 are output from blocks 468-471, respectively.

Figure 20:
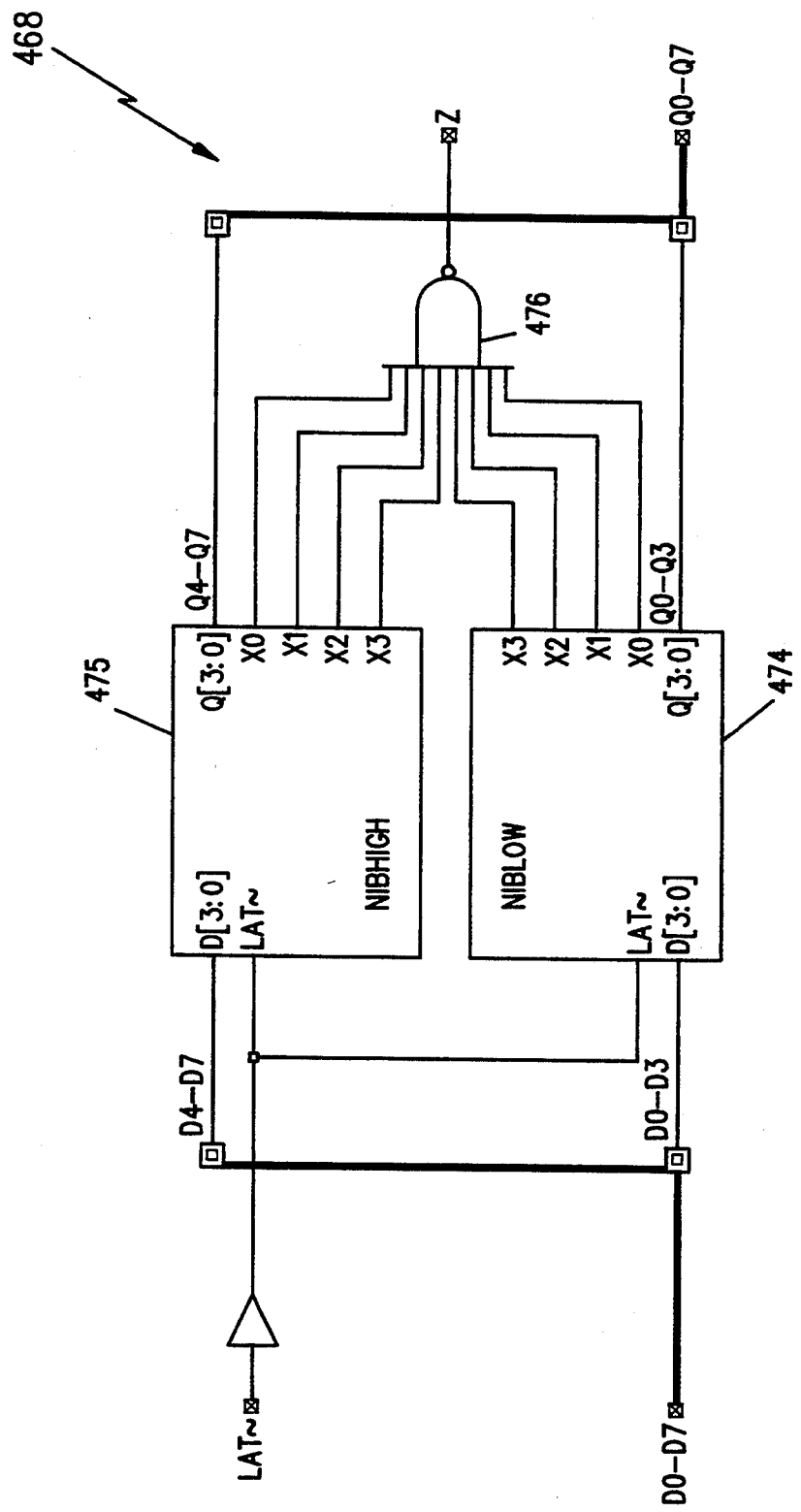
FIG. 20 is a block diagram of section 468 of FIG. 19.

FIG. 20 illustrates block 468 from FIG. 19 in still another block form. Block 468 is identical to blocks 469-471, except for the input and output signals. Signals D0-D7 are input to blocks 474 and 475, split evenly. X0, X1, X2 and X3 outputs from each of blocks 474 and 475 serve as inputs to NAND gate 476, providing a Z output.

Figure 21:
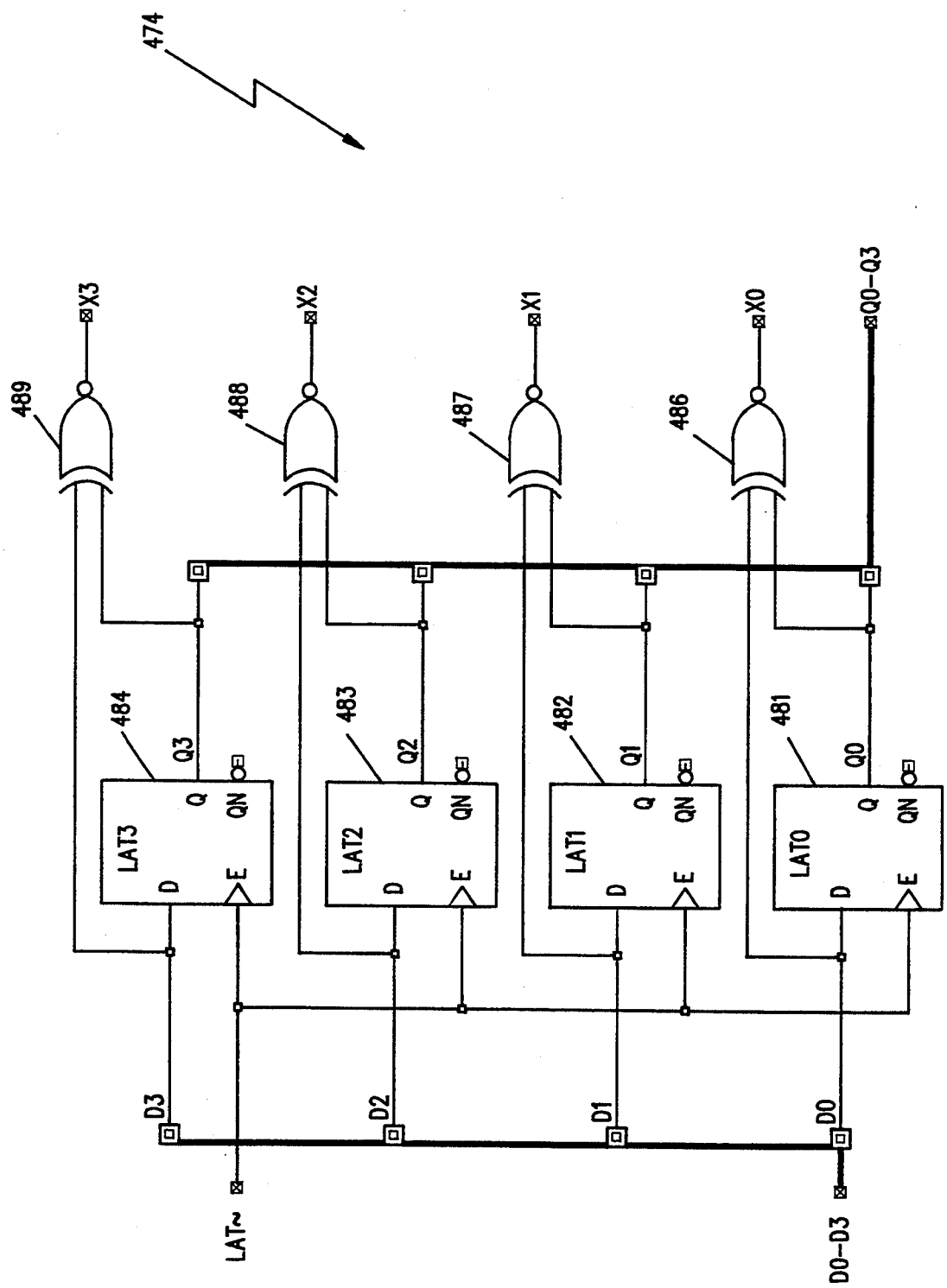
FIG. 21 is a schematic diagram of section 474 of FIG. 20.

FIG. 21 is a schematic diagram of block 474 which is identical to block 475. The address information, D0-D3, is stored in latches 481-484, respectively. Each of latches 481-484 has signal LAT~ applied to its E input. Q0, Q1, Q2 and Q3 are output from latches 481-484, respectively and provide inputs to exclusive NOR gates 486-489, respectively. Another input to each of the exclusive NOR gates is the address byte D0-D3, respectively. Exclusive NOR gates 486-489 serve as comparators to compare the input address bit to the output address bits prior to enabling the latches. Note that X0-X3 are applied as inputs to NAND gate 476 in FIG. 20 with the output from NAND gate 476 (and its counterpart) applied as inputs to NOR gate 473 (FIG. 19) to provide output SQEQADD.

Figure 22:
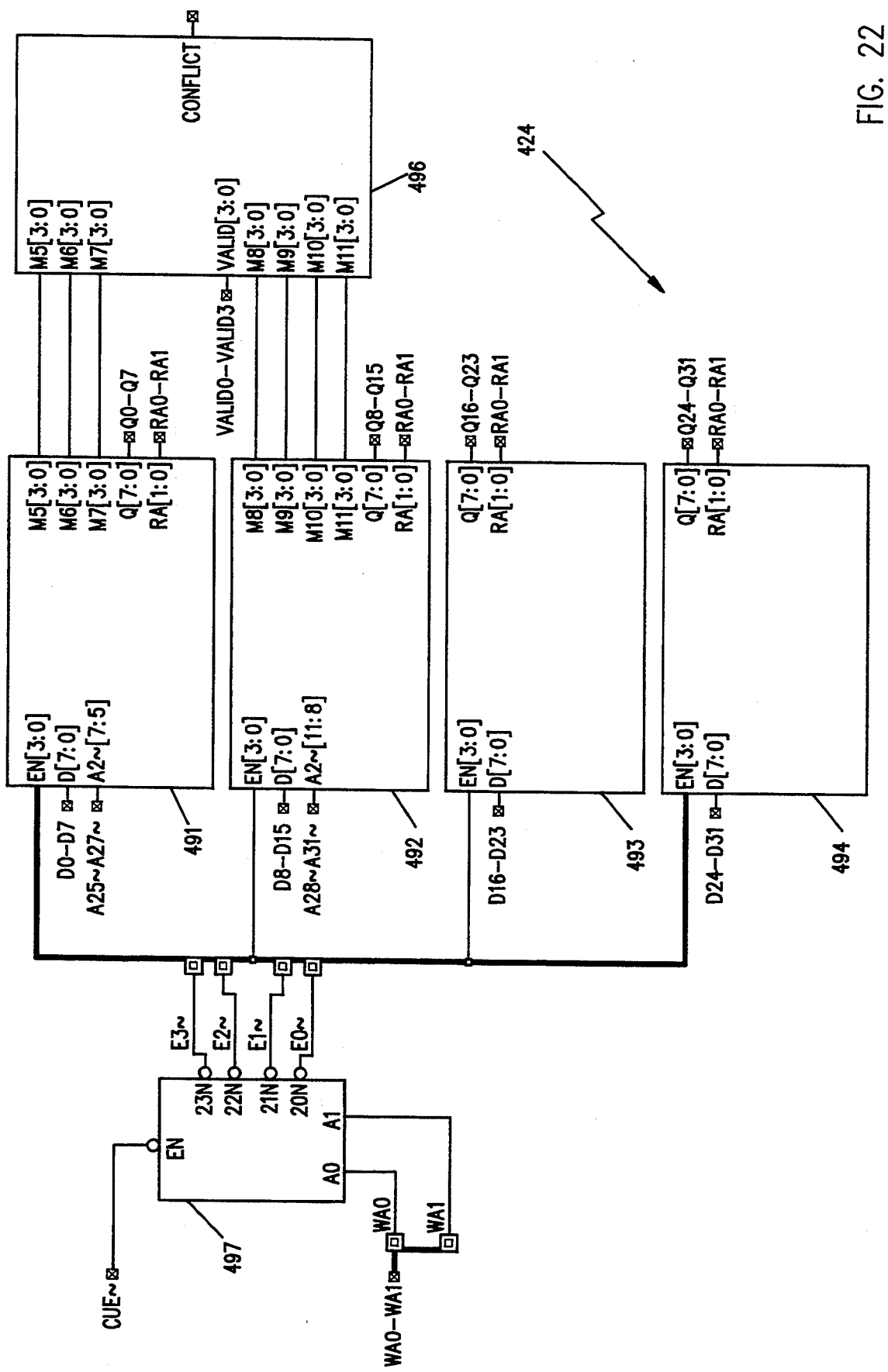
FIG. 22 is a block diagram of the address store queue 424 of FIG. 14.

FIG. 22 illustrates address queue 424 of FIG. 14. The address bits D0-D31 come from address temporary word 423 shown in FIG. 19. The signals Q0-Q31, output from address temporary word 423, come into address store queue 424 as signals D0-D31. Write signals WA0 and WA1 are input to decoder 497 which is enabled by signal CUE~ to select any of signals E0~ -- E3~. Block 496 receives outputs from blocks 491 and 492 and may detect a conflict between entries already in the queue. This will be discussed in detail later.

Figure 23A:
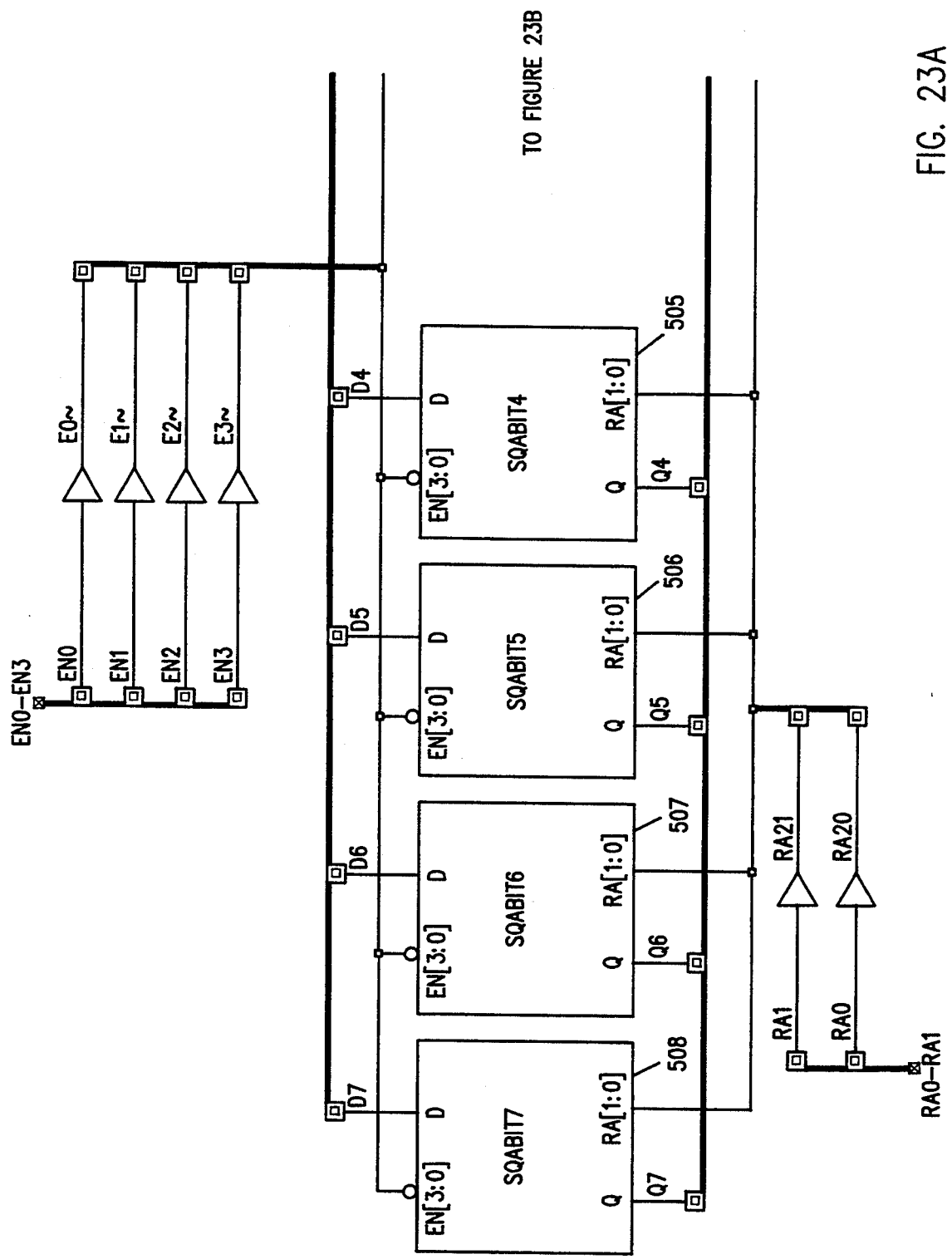
FIGS. 23A and 23B are a block diagram of a section 493 of FIG. 22.
Figure 23B:
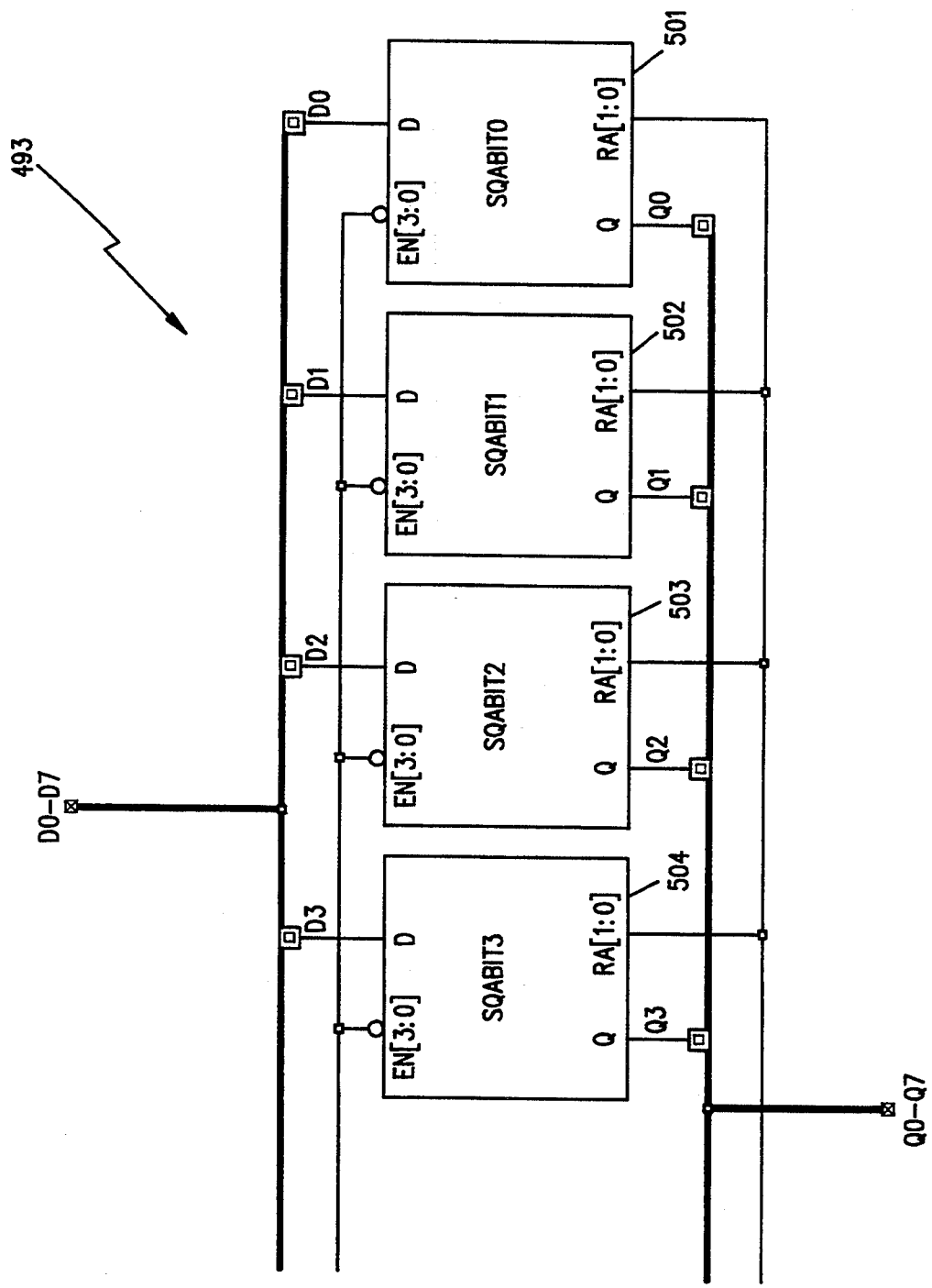

Turning to FIG. 23, block 493 is shown in more detail, illustrating blocks 501-508 for receiving signals D0-D7 upon enabling by signals E0~ -E3~. The output from blocks 501-508 are signals Q0-Q7.

Figure 24:
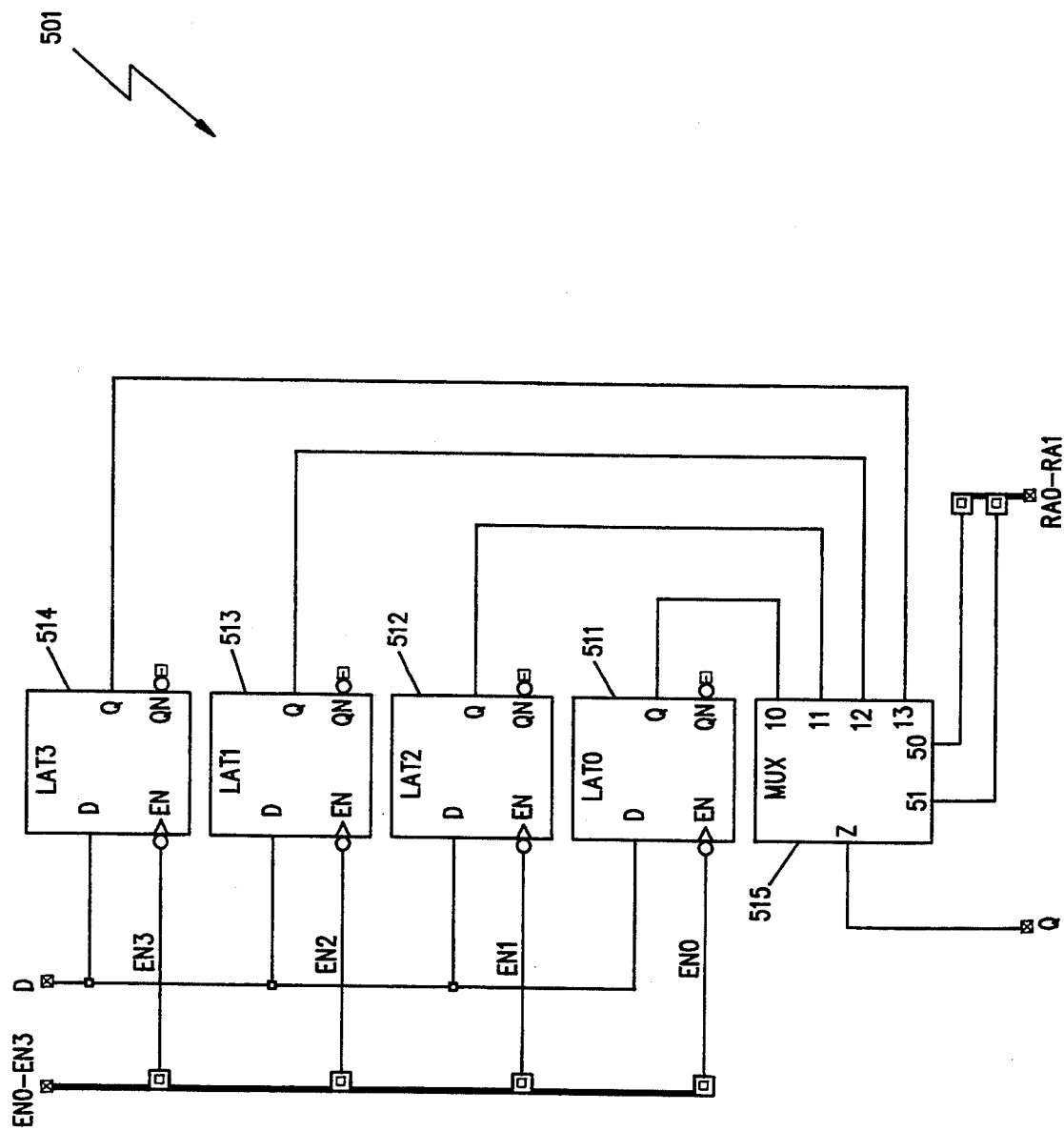
FIG. 24 is a schematic diagram of section 501 of FIG. 23.

FIG. 24 illustrates block 501 in schematic detail. Block 501 is identical to blocks 502-508. Latches 511-514 are enabled by signals EN0-EN3 and are set by data signals D0-D3, respectively. The Q outputs of each of latches 511-514 are connected to multiplexer 515 which is controlled by signals RA0-RA1 to select which of the latches is to be read out through multiplexer 515.

Figure 25A:
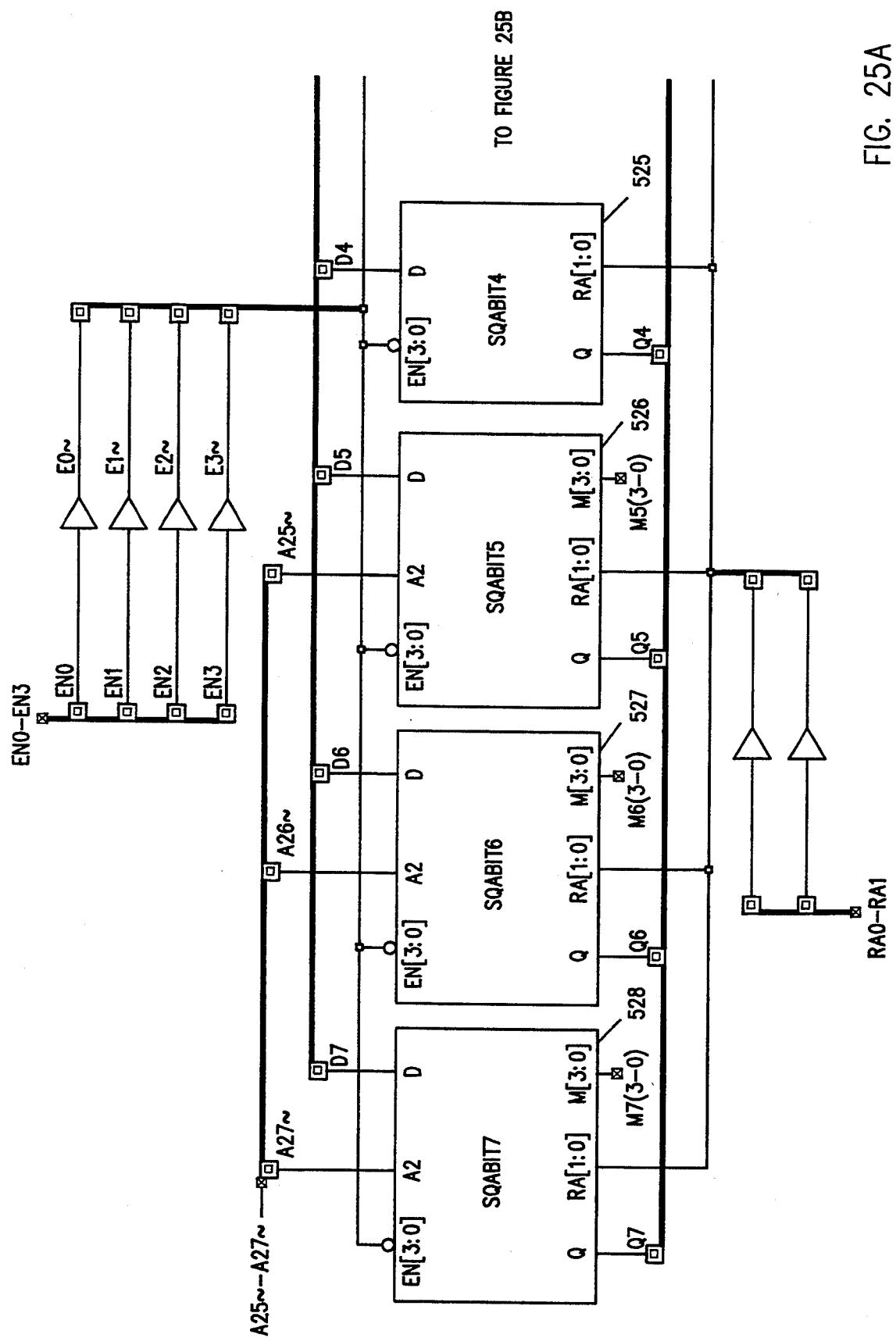
FIGS. 25A and 25B are a block diagram of section 491 of FIG. 22.
Figure 25B:
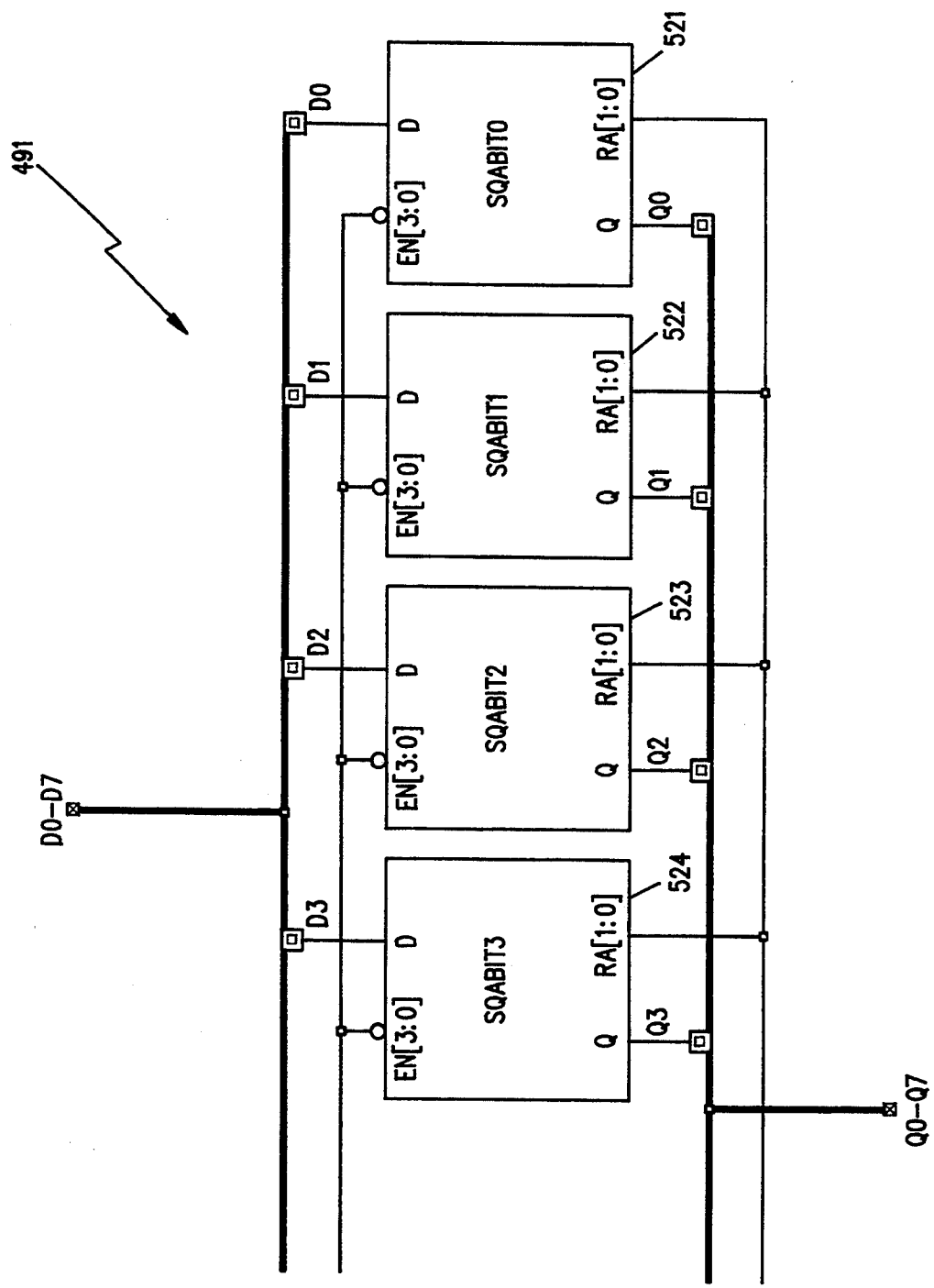

FIG. 25 is a more detailed block diagram of block 491 of address store queue shown in FIG. 22. The circuit is identical to that shown in FIG. 23 except for the addition in FIG. 25 of provision for the inputs of signals A25~ --A27~ blocks 526-528 respectively and for the output of signals M5(0-3), M6(0-3) and M7(0-3), the comparisons between the present contents, D5, D6, D7 with A25~ -A27~, respectively.

Figure 26A:
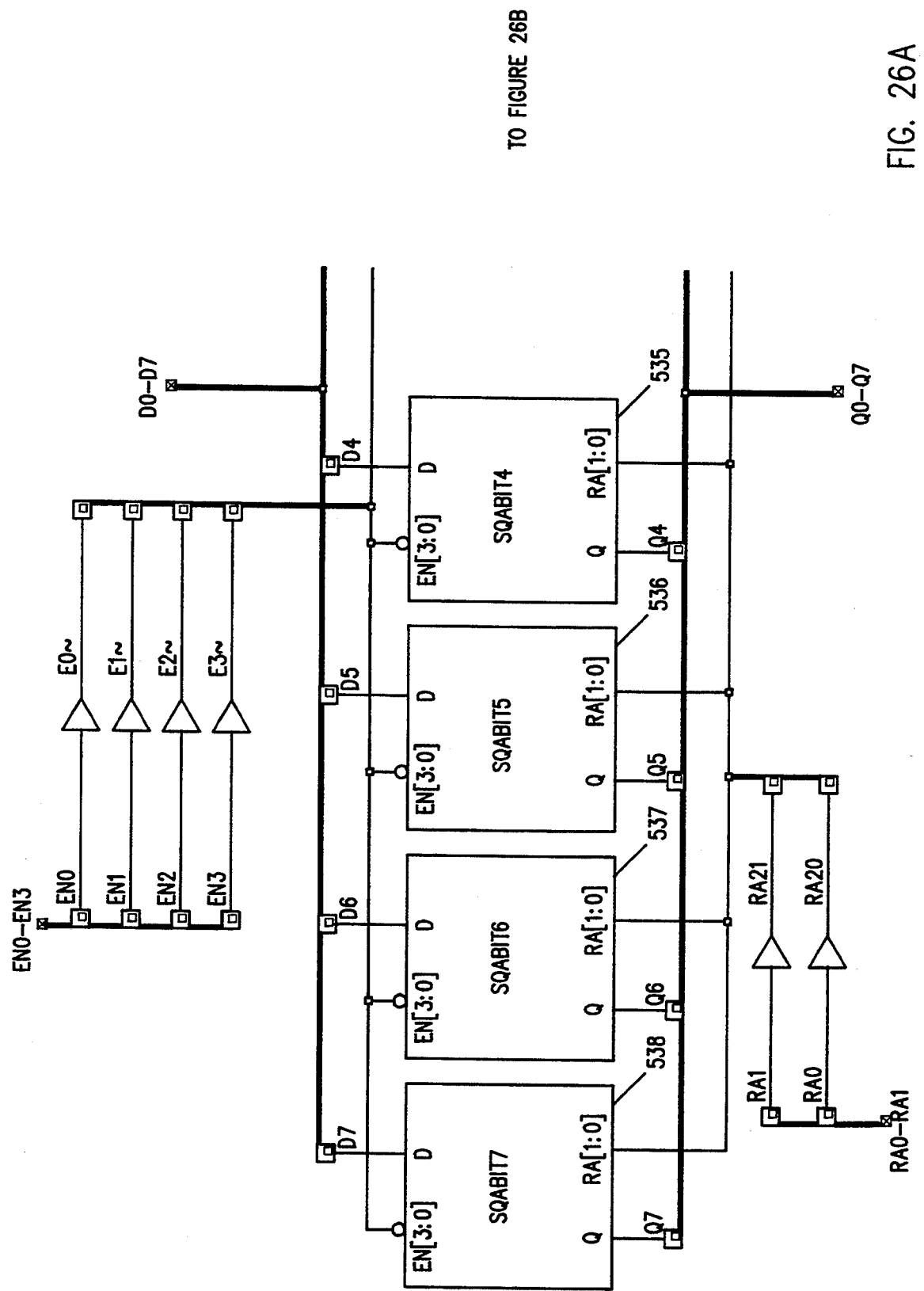
FIGS. 26A and 26B are a block diagram of section 492 of FIG. 22.
Figure 26B:
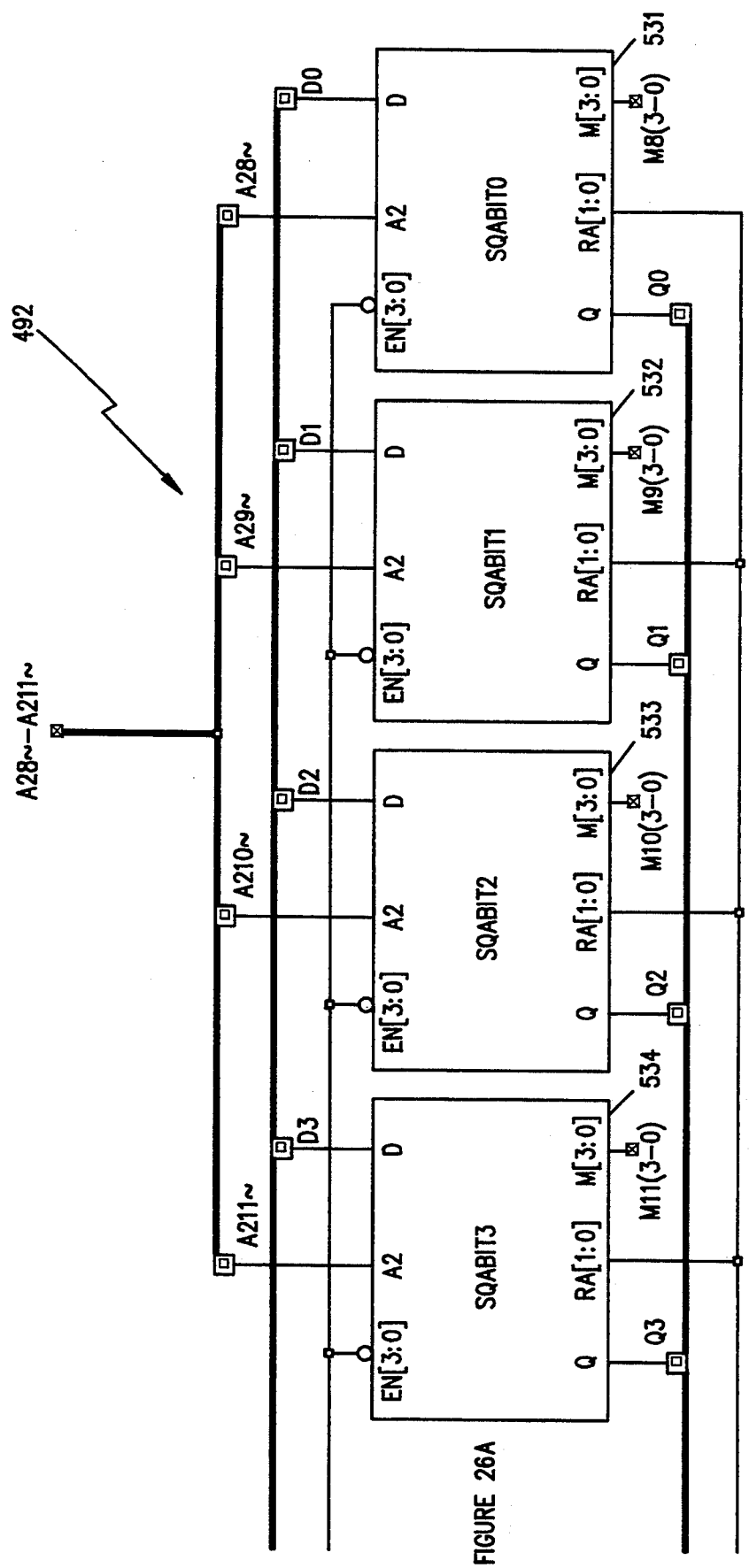

FIG. 26 is a more detailed block diagram of block 492 of FIG. 22 and is identical to FIG. 25 except that output signals M8(0-3), M9(0-3), M10(0-3) and M11(0-3) are provided.

Figure 27:
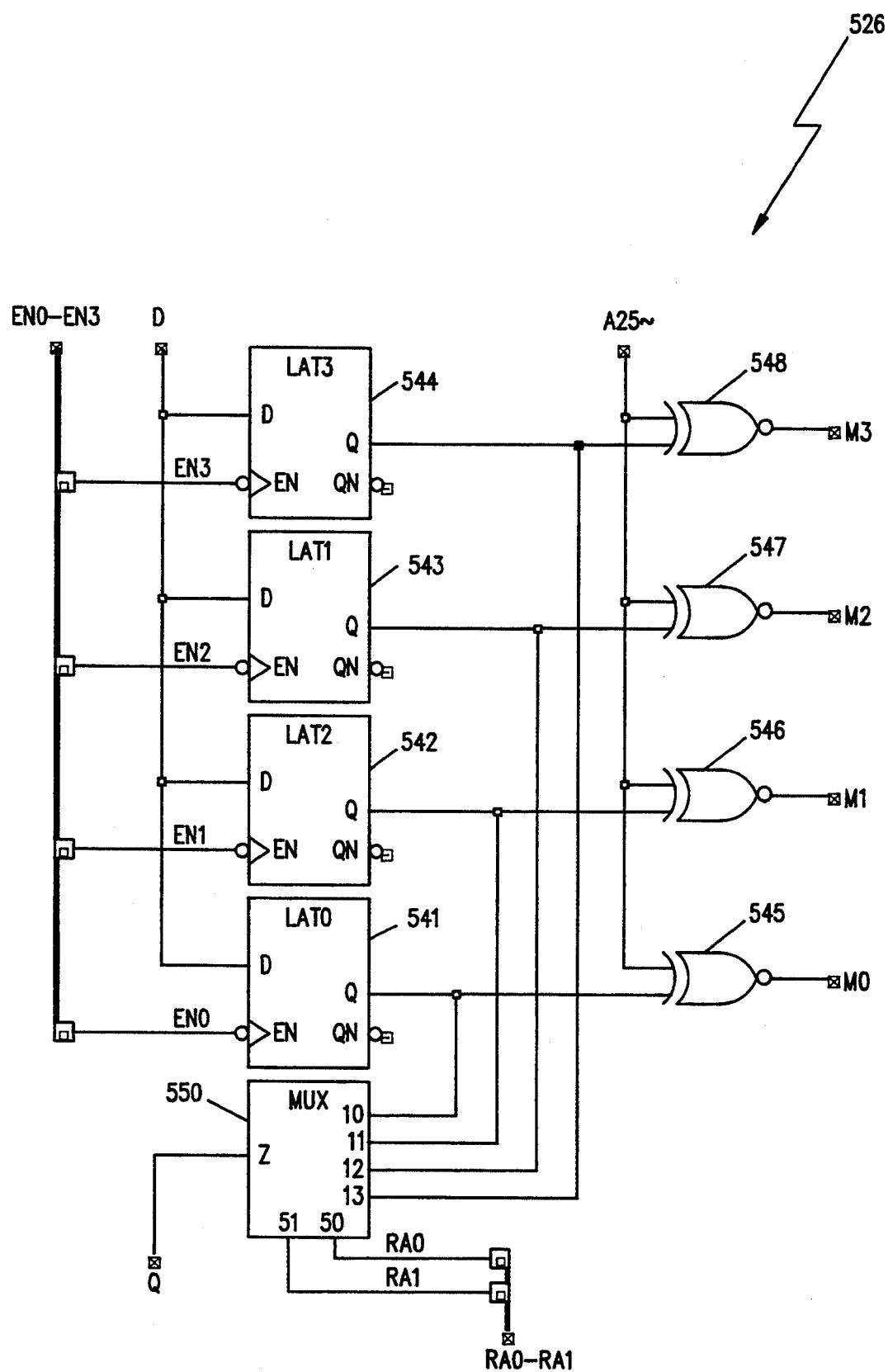
FIG. 27 is a schematic diagram of section 526 of FIG. 25.

FIG. 27 schematically illustrates block 526 which is identical to blocks 527 and 528. The address data is stored in each of the four latches 541-544 with the Q output of each latch providing one input to an exclusive NOR gate 545-548, respectively. The other input to the exclusive NOR gate is provided by signal A25~. The exclusive NOR gates 545-548 are gated by the outputs of latches 541-545. Multiplexer 550 is controlled by signals RA0 and RA1, and provides the Q outputs from the latches. The outputs from exclusive NOR gates 545-548 provide a comparison between the address information being provided by the processor in a read operation and that which is already present in the queue. If they are the same, the queue must be flushed.

Figure 28:
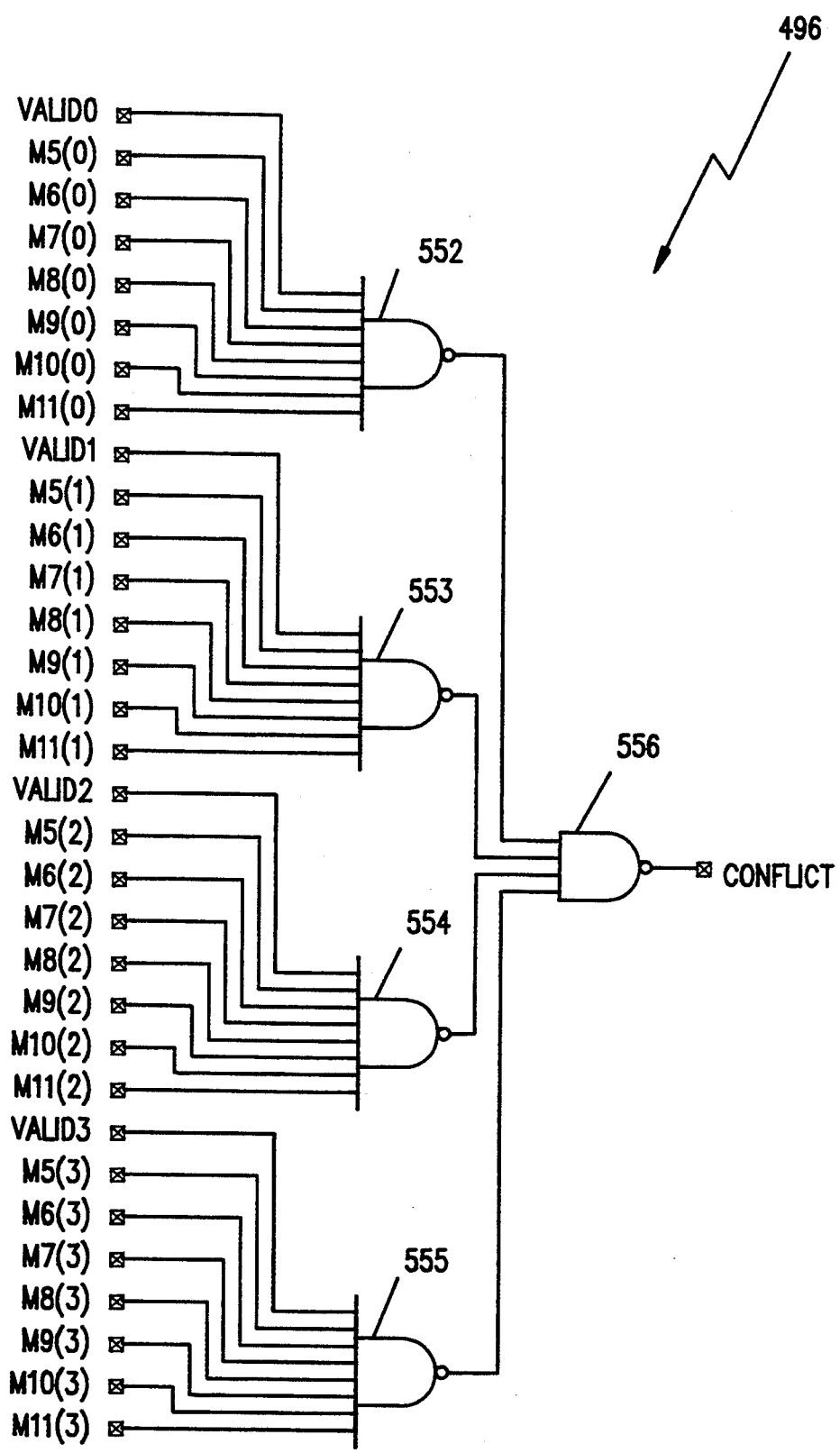
FIG. 28 is a schematic diagram of section 496 of FIG. 22.

In FIG. 28, the outputs M0-M3, from blocks 526-528 and 531-534 are applied to NAND gates 552, 553, 554 and 555, together with signals from circuit 426 provide a CONFLICT signal out of NAND gate 556. Note that these signals are derived from bits 5-11. The CONFLICT signal is sent to a controller that determines whether the queue should flushed (emptied).

To understand the workings of the above circuits, the following is a description of the various control circuits required.

Figure 29A:
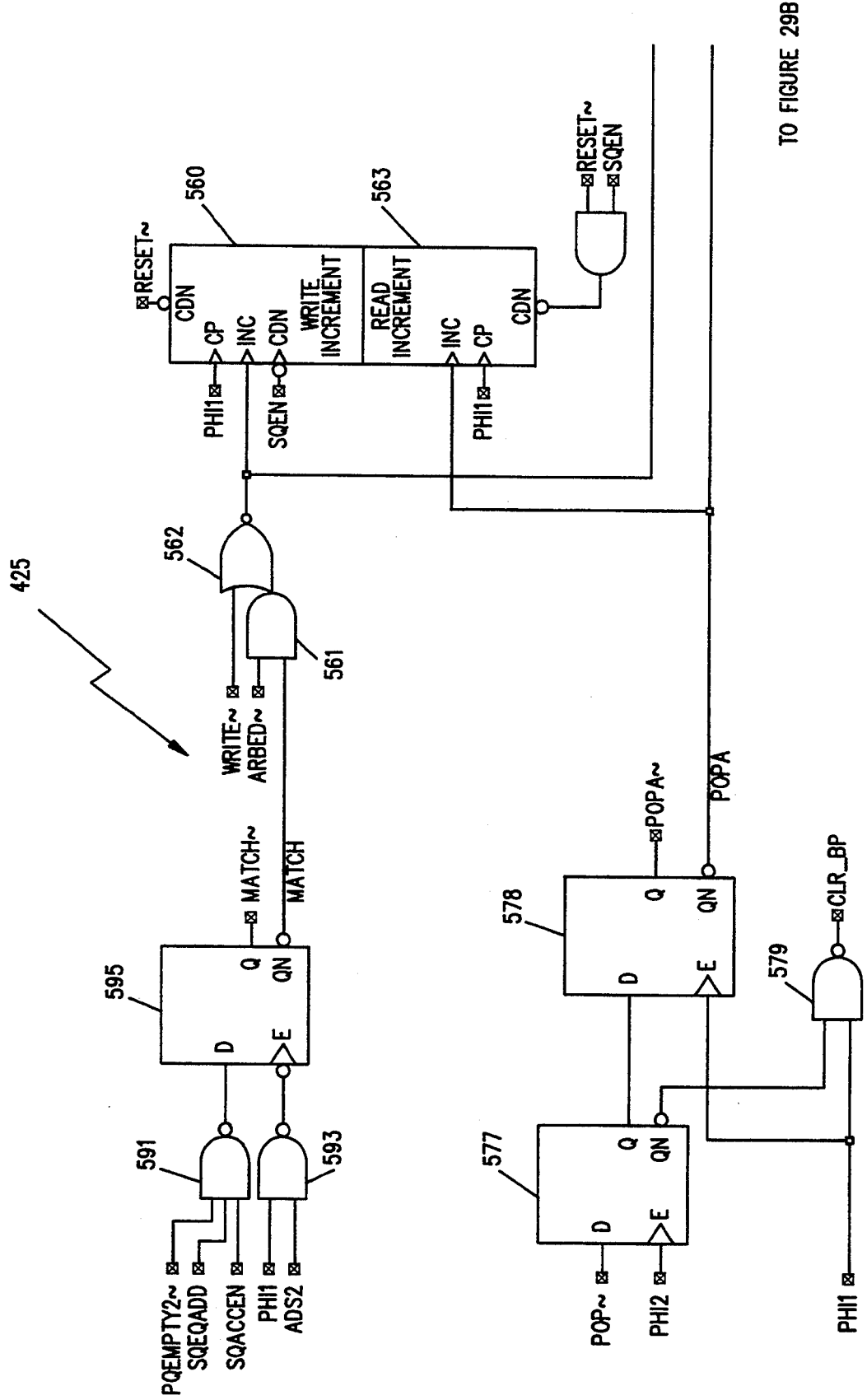
FIGS. 29A and 29B are a partial block, partial schematic diagram of the store queue address control 425 of FIG. 14.
Figure 29B:
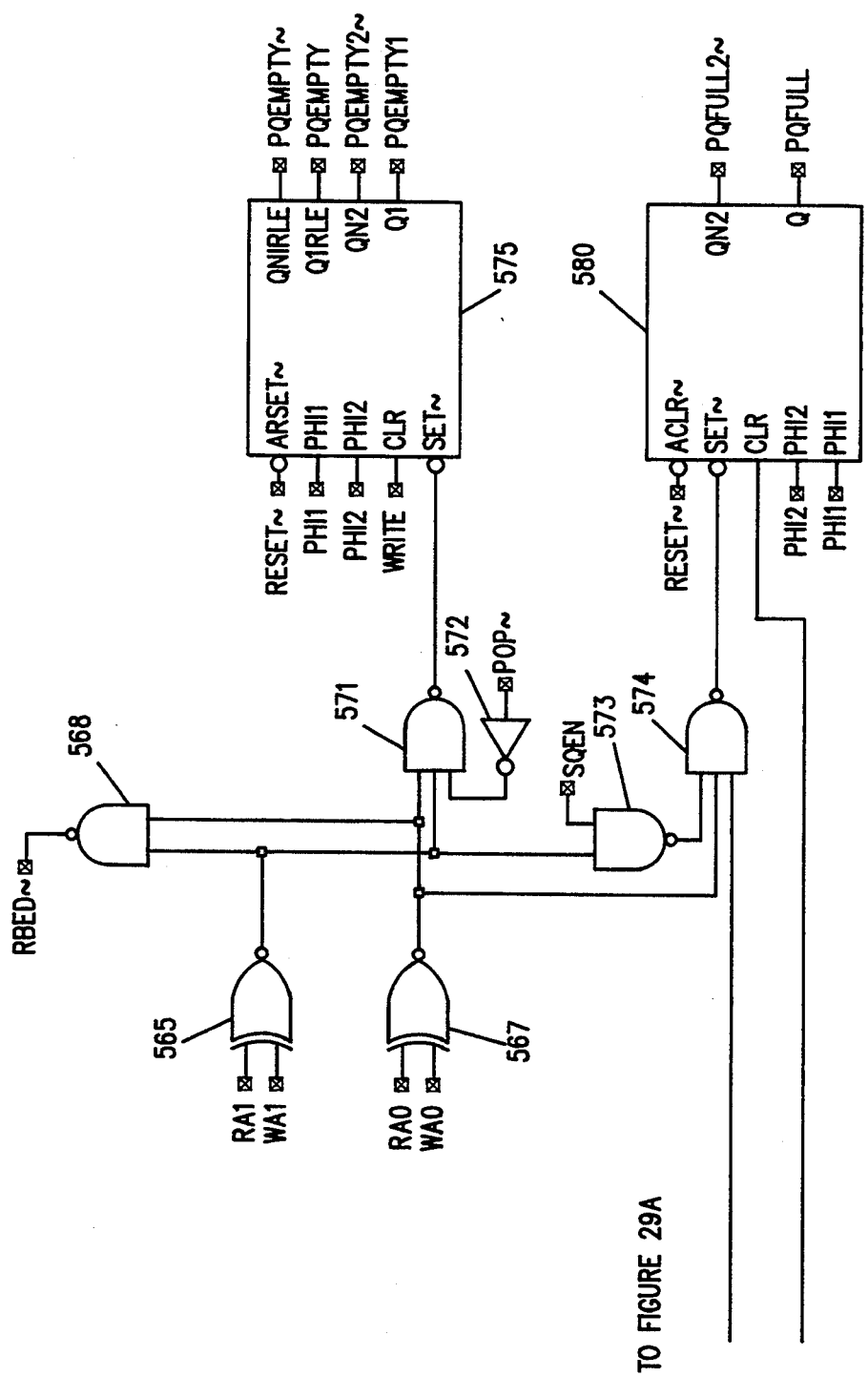

Queue address control 425 is shown in FIG. 29. This circuit includes an IN address WA0-WA1, and an OUT address RA0-RA1 of the store queue, controlling the position within the store queue to which information is being written and out of which position information is being read. Whenever information is written into the queue, the IN address is incremented depending on whether or not there is to be an accumulation at the particular location. Every time information is read from the queue, the outgoing address is incremented. The IN address is designated "WA" and the OUT address is designated "RA". AND gate 561 and NOR gate 562 determine whether the address will be incremented when information is to be written into the store queue. A WRITE~ signal provides one input to NOR gate 562 with the other input provided by the output from AND gate 561. A MATCH signal from the QN output of latch 595 provides one input to AND gate 561. The other input is provided by signal ARBED~ from the output of NAND gate 568. Therefore, when a write cycle is initiated, there is a match and signal ARBED~ is false, then the address will not be incremented through write incrementer 560. If there is no match, then there is an increment in address made by write incrementer 560. Thus, sequential writes to the same address will be placed in the same queue location.

NAND gate 591 provides the input to latch 595, which determines whether there is a match or no match of the previous address with the current address. The inputs to NAND gate 591 are signals PQEMPTY2~ from SQEMPTY 575, indicating that the store queue is not empty; signal SQEADD which indicates that the current address is the same as the previous address from NOR gate 473 of address temporary word 423 shown in FIG. 19; signal OPKEN21 which indicates that the address is cachable. Therefore, if the queue is already empty, or if the current address is different from the previous address, or if the address is not cachable, then latch 595 does not provide a MATCH true output. On the other hand, if all of those conditions are met, then MATCH is true. NAND gate 593 with inputs PHI1 and ADS2 enables latch 595. Signal ADS2 is a delayed version of the address strobe from processor 1. PHI1 is a clock pulse.

Latches 577 and 578 control the incrementing of read incrementer 563 and the clearing of SQ full 580. Latch 577 is set by signal POP~ from processor 11. Latch 577 is enabled by clock strobe PHI2. The POP~ signal is received before the address is actually to be incremented. It sets latch 577 which in turn sets latch 578. The QN output of latch 578 is applied to read incrementer 563. It also is connected to clear SQ full 580. The QN output of latch 577 provides one input to NAND gate 579, with clock PHI1 providing the other input. The output from NAND gate 579 is buffered (not shown) to provide signal CLR BP. Latch 578 is enabled by signal PH1. The output signal from latch 578, POPA, is signal POP~ delayed by one clock. The application of signal POPA to SQFULL 580 simply enables that indicator to indicate that SQFULL is not full because a read was just completed.

NAND gate 568 provides signal ARBED~. Exclusive NOR gate 567, having inputs signals RA0 and WA0, provides a high output when RA0 WA0 are equal, providing one input to NAND gate 568. Exclusive NOR gate 565 provides a high output when both inputs, RA1 and WA1 are equal, providing the other input to NAND gate 568. With the inputs to NAND gate 568 high, then the output signal ARBED~ is true low. This indicates that there is only one entry in the queue that may be dequeued without warning. Therefore accumulation is not possible.

The output from exclusive NOR gate 567 also provides one input to NAND gate 574 which, when true, indicates that the lower order bits of the read and write addresses are the same. Another input to NAND gate 574 is provided by the write signal output from NOR gate 562 indicating that a write is to occur. The output from NAND gate 573 provides the third input to NAND gate 574. Its inputs are provided by exclusive NOR gate 565 and signal SQEN. The output of NAND gate 573 is high if RA1 and WA1 are dissimilar or if store queue is turned off. With a write then the output of NAND gate 574 sets SQFULL 580 to the full state.

NAND gate 571 receives one input from exclusive NOR gate 567 and one input from exclusive NOR gate 565. A third input is provided by the POP~ signal inverted. The output of NAND gate 571 is connected to the SET~ input to SQEMPTY 575. When the read and write addresses are the same, providing true outputs from gates 565 and 567 together with a POP~ signal, then SQEMPTY 575 is set to indicate that the queue is empty.

Figure 30:
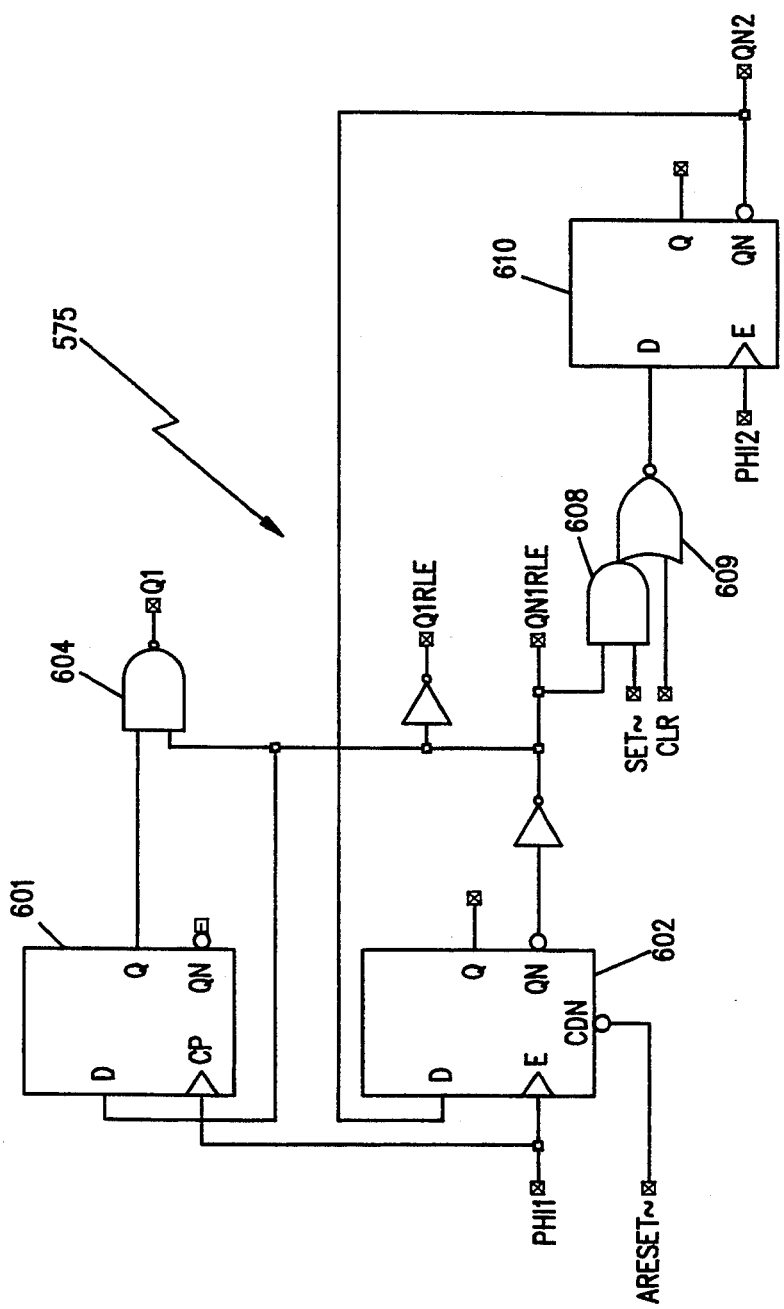
FIG. 30 is a schematic diagram of SQ empty 575 of FIG. 29.

FIG. 30 schematically illustrates SQEMPTY 575 with the SET~ input connected to one input of AND gate 608 and the CLR input connected as an input to NOR gate 609 whose other input is the output from AND gate 608. The output of NOR gate 609 is connected to the D input of latch 610 whose QN output is connected to the D input of latch 602. The QN output of latch 602 is inverted and connected as the other input to AND gate 608, completing a loop that forms a flip-flop by latches 602 and 610. Flip-flop 601, whose D input is provided by the inverted QN output from latch 602 simply delays the output from latch 602. The flip-flop formed by latches 602 and 610 retains the state of SQEMPTY. The output signals shown, Q1, Q1RLE, QN1RLE and QN2 have different timing and opposite senses but are all used to indicate the state of SQEMPTY. Signal QN2 is the first of the indicator signals. These signals are used in various other parts of the accompanying circuit, depending upon when the information is required.

Figure 31:
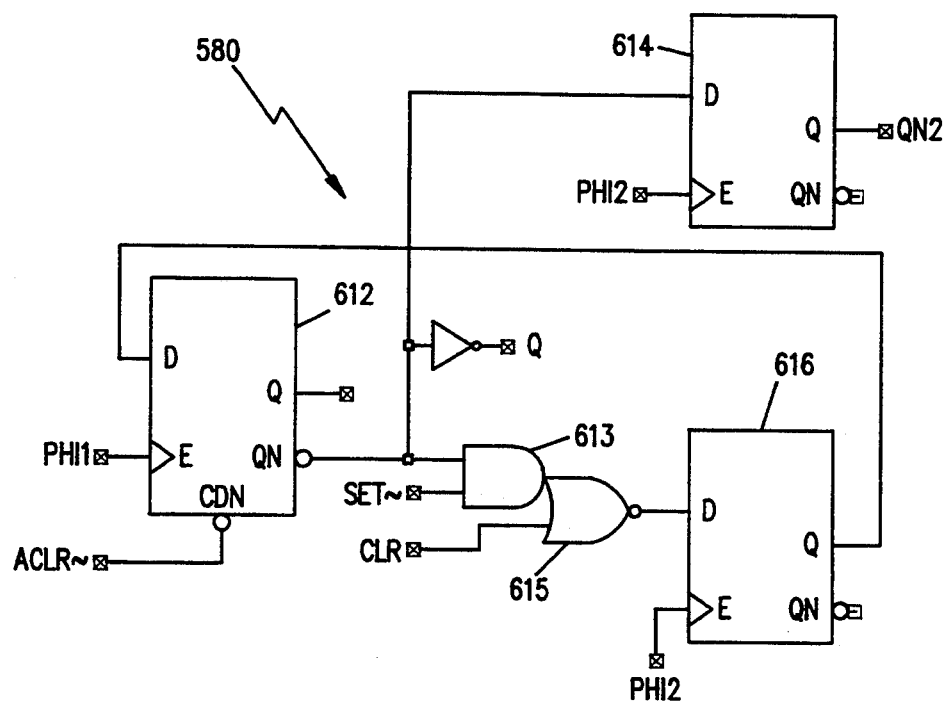
FIG. 31 is a schematic diagram of SQ full 580 of FIG. 29.

FIG. 31 schematically represents SQFULL 580. Latches 612 and 616 are interconnected as shown to form a flip-flop for holding the state of SQFULL. Latch 614 delays the output by one phase. The QN output from latch 612 provides one input to AND gate 613 with SET~ providing the other input.

The CLR input is connected to NOR gate 615 whose other input is provided by the output from AND gate 613. The output from NOR gate 615 is connected to the D input of latch 616 whose Q output is connected to the D input of latch 612. The QN output from latch 612 is connected to the D input of latch 614 which is clocked by PHI2, which is out of phase with clock PHI1. The outputs Q and QN2 provide the state of SQFULL.

Figure 32:
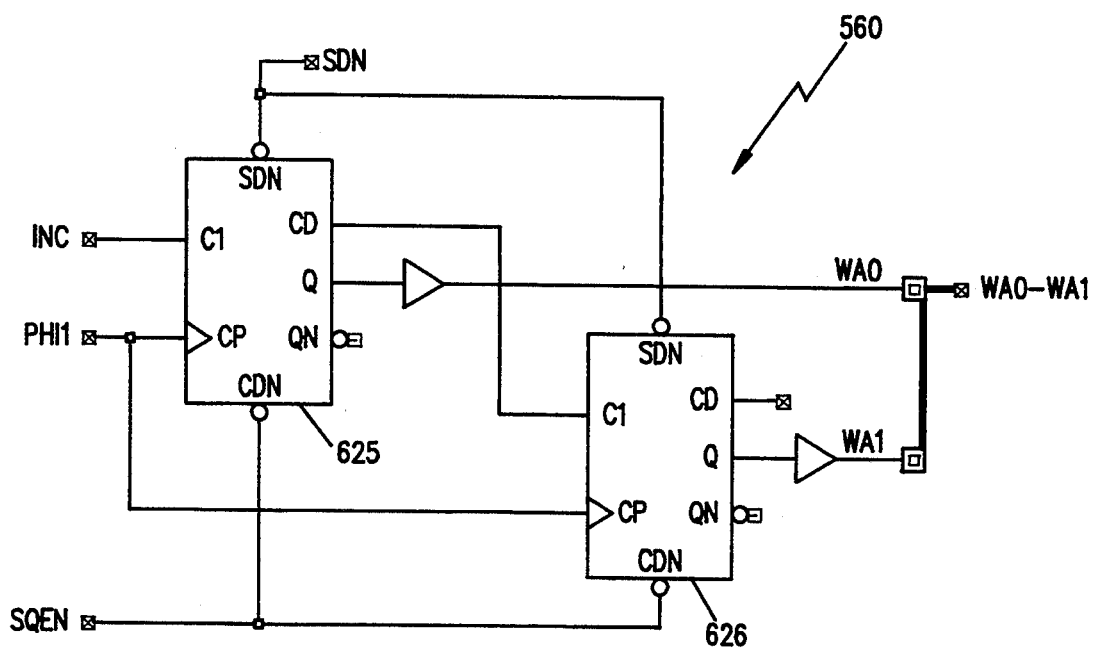
FIG. 32 is a schematic diagram of the write incrementer 560 of FIG. 29.

FIG. 32 schematically illustrates write incrementer 560 which uses standard increment counters 625 and 626. The increment signal is applied to terminal C1 with the clock PHI1 being applied to terminal CP of each of the synchronize counters 625 and 626. The carry output from element 625 is applied to the CI input of 626 with the Q output of element 625 providing signal WA0 and the Q output of element 626 providing output WA1.

Figure 33:
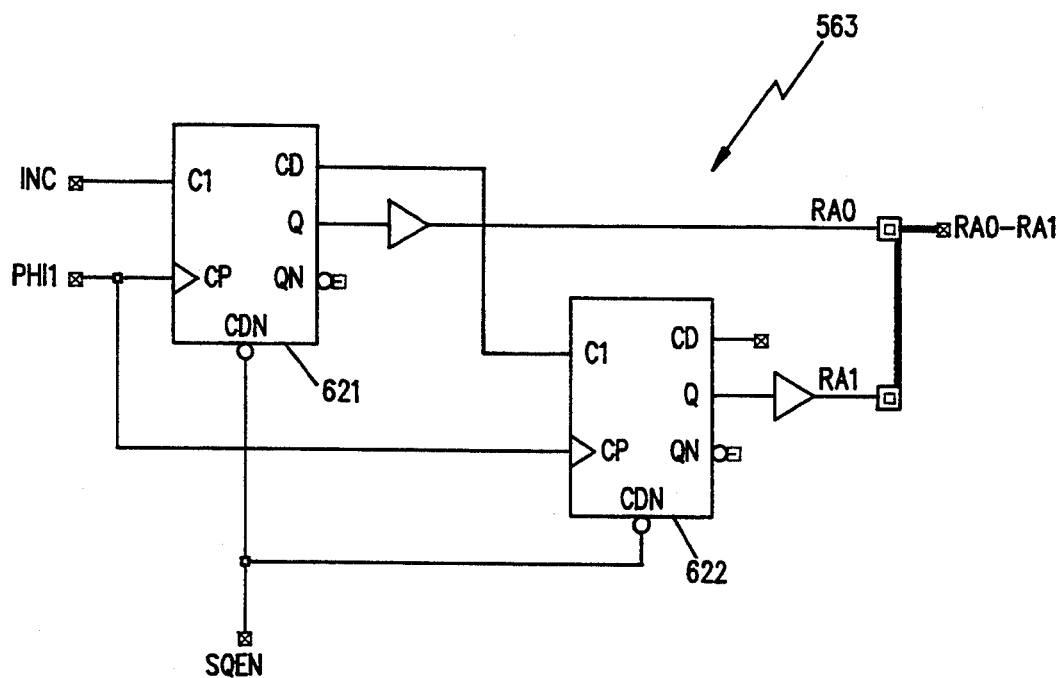
FIG. 33 is a schematic diagram of the read incrementer 563 of FIG. 29.

FIG. 33 schematically depicts read incrementer 563 which has synchronize counter elements 621 and 622. The increment input is connected to the CI input of element 621 whose carry out is connected to the CI input of element 622. The Q output of element 622 provides an RA1 output and the Q output from element 621 provides an RA0 output.

Figure 34:
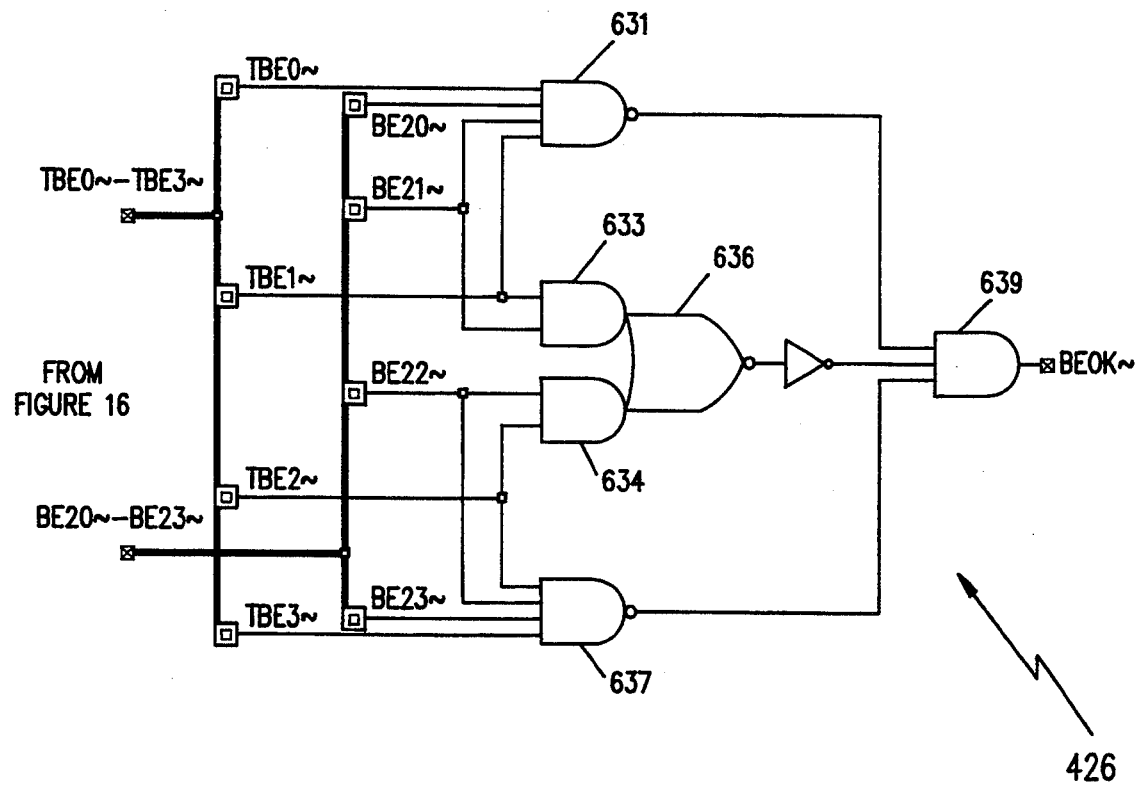
FIG. 34 is a schematic diagram of valid byte enable 426 of FIG. 14.

FIG. 34 illustrates combinatorial logic for determining valid byte enable combinations. That is, certain combinations of bytes within a 32 bit word are invalid because of arbitrary decisions made by the industry. The invalidity relates to bus protocol and to certain peripheral devices. The input signals BE20~-BE23~ are the current byte enables and signals TBE0~-TBE3~ from address decoder 422 are the previous byte enables. NAND gate 631 receives signal TBE0~, TBE1~, BE20~ and BE21~. NAND gate 637 receives TBE2~, TBE3~, BE22~ and BE23~. AND gate 633 receives TBE1~ and BE21~. AND gate 634 receives TBE2~ and BE22~. The output of AND gates 633 and 634 serve as the inputs to NOR gate 636 whose output is inverted and provides one input to AND gate 639. The other inputs to AND gates 639 are provided by the outputs from NAND gates 631 and 637. The output from AND gate 639 is signal BEOK~ which indicates a valid combination of bytes, or not.

FIG. 35 is a schematic diagram of the central control of writes going into the store queue. The starting point is at NAND gate 663. Input CO-2 indicates a memory I/O cycle; signal ADS2 is an address strobe signal from processor 11; signal PIGNORE2~ indicates that the cycle is not for a co-processor; signal WREG~ indicates that the cycle is not an ignored register cycle. With these inputs high to NAND gate 663, its output is low and causes the output of NAND gate 665 to go high, setting latch 640. The Q output from latch 640 provides one input to NAND gate 648 whose output is connected to the D input to latch 650. The Q output from latch 650 connects to one input to NAND gate 665, thereby, completing a loop, causing a flip-flop to be formed by latches 640 and 650. The QN output from latch 640 and provides an input to OR gate 642 whose output is inverted by inverter 644, providing signal WRITE. Flip-flop 640-650 then keeps track of the fact that there is a cycle and, when the store queue is full, holds the cycle and does not process it. AND gate 646 receives signals MATCH~ and PQFULL so that, if there is no MATCH and PQFULL, then the Q output of latch 640 will feed back through latch 650 to hold the pending cycle. If there is a match, or if the queue is not full, the feedback path is broken.

The WRITE signal is applied to the D input of latch 658 whose Q output is connected to the D input of latch 660, forming a flip-flop. The Q output from latch 660 provides one input to NAND gate 661 whose other input is a clock strobe PHI2. The output from NAND gate 661 is signal CUE~. The WRITE signal is also applied to NAND gate 673 whose other inputs are provided by NAND 676 and the Q output from latch 666.

The Q output from latch 640 provides the D input to latch 652 and one input to NAND gate 655. The QN output from latch 652 is connected to the D input of latch 654 whose Q output provides another input to NAND gate 655. The third input to NAND gate 655 is a clock strobe PHI2. The output from NAND gate 655 is inverted by invertor 656 whose output is signal LAT~. Signal LAT~ is a strobe which latches the cycle information in the temporary word. The Q output from latch 654 assures that there will not be a second LAT~ signal if the cycle is not processed immediately.

Signal SQRDYA~ is the output from NAND gate 649 and is an "early" ready signal which is present when there is a generic memory write cycle, where the store queue is not full, and it can be handled immediately. Signal SRDYB~ from NOR gate 683 is the "late" ready signal. For "early" ready, the inputs to NAND gates 649 must all be satisfied: input PQFULL 2~ indicating that the queue is not full; signal C2-2 indicating memory data; signal C2-0 indicating a write cycle; signal ADS2 indicating the initiation of a memory cycle; signal ILOCK~ indicating no lock cycle; signal WEITCYC2~ indicating no co-processor cycle. If the output from NAND gate 649 goes low, latch 662 QN output to the input of NAND gate 676 is clocked high, causing the output of NAND gate 676 to go high. Latch 666 is enabled by an I/O cycle.

If NAND gate 649 has a high output and therefore SQRDYA~ is high, then the QN output of latch 662 will clock low, forcing the output of NAND gate 676 to go high allowing the write signal to go through latch 664. This also occurs when the output of NAND gate 675 goes low indicating a special case where the processor/cache was unable to accept early ready SQRDYA~. The QN output of latch 664 provides one input to AND gate 681 which, in turn, provides one input to NOR gate 683 whose output is the late ready signal SQRDYB~.

The Q output of latch 672 provides one input to AND gate 682 whose output provides the other input to NOR gate 683. The Q output from latch 672 provides one input to AND gate 679 whose output provides one input to NOR gate 680. The output of NOR gate 680 provides the D input to latch 670 with the QN output of latch 670 connected to the D input of latch 672. Latches 670 and 672 therefore form a flip-flop which is used to hold off the ready to the processor/cache in the case of a locked cycle until store queue is empty and the cycle has completed to memory or the I/O channel.

Signal MBEMPRL1 and PQEMPTY provide the two inputs to NAND gate 677. If s cnal PQEMPTY is true and signal MBEMPRL1 from processor 11 is also true, then output QN from latch 668 will be high which allows gate 682 to pass data from latch 672. The QN output of latch 664 either flows through NAND gate 681 and NOR gate 683 as signal SQRDYB~ or is delayed some amount of time by the signal MBEHPRL1.

If that signal is false then the QN output from latch 668 is low and gate 682 is disabled. Therefore signal SQRDYB~ does not occur. Instead, the Q output from latch 672 feeds back through gates 679 and 680 to latch 670. When signal MBENPRL1 goes true, then output QN from latch 668 goes high, enabling gate 682 to pass the Q output from latch 672 through NOR gate 683 to provide signal SQRDYB~ to determine the end of the cycle.

Figure 36:
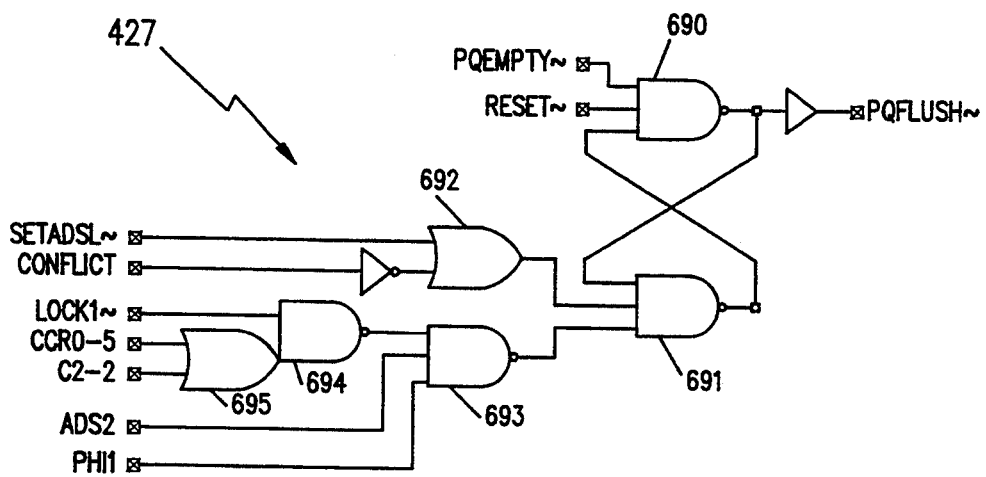
FIG. 36 is a schematic diagram of the flush circuitry 427 of FIG. 14.

Flush circuitry 427 is shown in FIG. 36. The output signal PQFLUSH~ indicates that the store queue should be flushed. The manner in which this condition is determined is by monitoring a variety of conditions as set out earlier. Signal SETADSL~ merely indicates that there is a read cycle pending, that read cycle being outside the store queue. Nevertheless, the read cycle uses the same address lines as does the store queue so that a CONFLICT signal may be present, inverted and input, along with SETADSL~ to OR gate 692. Therefore, if the output of OR gate 692 is low, the PQFLUSH~ is asserted indicating that the store queue is to be flushed until it is empty.

There is also a requirement to flush store queue during a lock cycle and an I/O cycle. Signal LOCK1~ indicates that there is a true lock cycle. C2[2] indicates that it is an I/O cycle. CCRO[5] indicates that the I/O's are to be flushed. All of these signals come into NAND gate 693 causing the output to go low and setting cross-coupled NAND gates 690 and 691 to cause output PQFLUSH~ to be asserted. The reason for flushing the store queue is to avoid any inconsistency problem.

MODE OF OPERATION OF THE INVENTION

Turning first to FIG. 1, for purposes of illustration, assume that processor 11 makes several memory references to memory 12a through memory connector 17.

Referring to FIG. 2, processor 11 is shown as microprocessor 30 (and coprocessors 31 and 32) having a connection to memory connector 17 through data flow and ECC controller 41, and memory and bus controller 40. The data to be stored passes through data flow and ECC controller 41, while the addresses for the data flow through memory and bus controller 40. In this preferred embodiment, the byte enable (segment present) indicating which byte in a word is to be written is sent to both data flow and ECC controller 41 and memory and bus controller 40. The separation of the data and the address is arbitrary and could of course be together on a single chip in which event the byte enable would not be duplicated. Data is transmitted to memory in bytes because of upward compatibility of the software for personal computers from the very early personal computers which used an 8 bit (byte) word, and because many of the peripheral devices use an 8 bit (byte) word. The size of the segment (byte) is, of course, not limiting to this invention. The segment could be any arbitrary portion of a data word. For purposes of describing the operation of this invention, the designation "byte enable" will be used instead of "segment present" and "byte" will be used instead of "segment".

FIG. 4 illustrates the overall store queue for data and also for addresses. The first byte of data comes into temporary word 115. At the same time, the address of that byte of information comes into the address temporary word 423 of FIG. 19. Byte enable signals (BEN0-~-BEN3~) are sent to byte present temporary word 113 (FIG. 8) and also byte present temporary word 421 in FIG. 15. The byte enable in FIG. 8 is synchronized in time with the data signal through latches 152-155, using signal LAT~ from control 428 of FIG. 35 (see also FIG. 37). Cache controller 35 utilizes a posted write technique which requires that the write data, address and byte enable be immediately transferred so that other computer operations can take place. The posted write necessitates that the data, address and byte enable be stored in these temporary registers. The next step to be taken is for the contents of the temporary registers to be transmitted into the store queue. The store queue is made up of a data store queue, an address store queue and byte enable store queue.

The address from the address temporary word 423 (FIG. 19) must be compared to the current address to determine whether the byte storage will be made at the same address as the current address. If signal SQEQADD, output from NOR gate 473 in FIG. 19 is true, the incoming address equals the current address. FIG. 20 illustrates logic block 468 from FIG. 19, and FIG. 21 illustrates logic block 474 from FIG. 20. FIG. 21 schematically demonstrates the comparison between incoming address D0-D3 with latched address Q0-Q3, in exclusive NOR gates 468-489 to yield bit comparisons at terminals X0-X3, respectively. These terminals may be seen in FIG. 20 where their outputs are sent to NAND gate 476 with its output designated as "Z". The Z output of each of logic blocks 468-471 in FIG. 19 serves as an input to OR gate 473 which yields signal SQEQADD. In that manner, the comparison between the incoming address and the present address is made.

Referring to FIG. 29, signal SQEQADD is input to NAND gate 591, along with signal OPKEN21 which indicates that the address is cachable and signal PQEMPTY2~ from SQEMPTY 575 which indicates that the store queue is not empty. When all these conditions are met, and the ARBED~ signal is high (indicating more than one entry in the queue), and a WRITE~ operation occurs, then write incrementer 560 increments the data store queue address. The outputs from write incrementer 560 are signals WA0 and WA1.

Signals WA0 and WA1 are used in the address store queue 424 (FIG. 22) for selecting the store queue address (i.e., one of the four in the queue) into which the memory address will be written. The store queue address for the memory address is the same as the store queue address for the data to be stored at the memory address. WA0 and WA1, as shown in FIG. 22, are input the decoder 497 for providing enable signals E0~--E3~ for selection of one of the four store queue positions. That position is dictated by the values of signals WA0 and WA1.

Signals WA0 and WA1 are also used in the byte present queue 422 is shown in FIG. 16. The particular byte present also uses the same store queue as that for data and memory address. FIG. 17 illustrates WA0 and WA1 selecting which of the four locations in the store queue that the byte present will reside.

Signals WA0 and WA1 are buffered and renamed as signals WSEL0 and WSEL1. These signals are applied to decoder 114 as shown in FIG. 9 for selecting the data store queue address corresponding to that of the memory address store queue address and the byte present store queue address. FIG. 10 illustrates signals WSEL0 and WSEL1 applied to decoder 181 of block 171 of FIG. 9 to make the address selection for the byte present associated with the data store queue in this preferred embodiment. This byte present queue 114 is used as control for Error Correction Code (ECC) when a byte or bytes are to be written to data in memory. The data is removed, the byte or bytes are substituted and ECC is calculated. Then the data and the ECC bits are replaced in the memory. The byte present queue 422 (FIG. 16) has byte present information that is used in connection with the address and corresponding data to actually write into the memory, and to read from the memory, modify, calculate ECC and write to the memory under the control of byte present queue 114.

Data store queue 116, shown in FIG. 11, has signals WSEL0 and WSEL1 applied as shown in FIG. 12 to decoder 209 to select the store queue address that is the same as the store queue address as for the byte present and the address store queue address.

Referring again to FIG. 29, before store queue can be entered with new information, store queue empty 575 and store queue full 580 must be queried. For example, to accumulate bytes at the same queue location, it is necessary that signal PQEMPTY2~ be true, indicating that store queue is not empty, that signal being applied to NAND gate 591 as set out above.

In FIG. 35 controller 428 also indicates the use of signals PQFULL and PQEMPTY. That is, if PQFULL is high (and there is not address MATCH), then the Q output of latch 640 feeds back through gate 648 to the D input of latch 650 whose Q output feeds back through gate 665, thereby providing a flip-flop for keeping track of the fact that a cycle has been initiated and that the store queue is full. When the queue is not full, or if there is a MATCH, then the QN output of latch 640 is fed through latches 658 and 660, and NAND gate 661 to provide signal CUE~ to enqueue information.

Note that NAND gate 649 has the signal PQFULL2~ as one input, and if true indicates that the queue is not full. If that input together with the other conditional inputs is true, then the output of NAND gate 649 will be low causing an immediate SQRDYA~ signal to the processor, otherwise it will cause the WRITE signal to flow through latch 664 to AND gate 681 and 678 to provide the late ready signal SQRDYB~ if there is no lock cycle, or to set flip-flop 670-672 if there is a lock cycle. When PQEMPTY and signal MBEMPRL1 are true, data will pass through gates 682 to provide the late ready signal SQRDYB~.

Signals SQRDYA~ and SQRDYB~ the early and late store queue readies, respectively, simply indicate the end of the cycle.

Referring next to FIG. 34, signal BEOK~ is developed indicating that the particular combinations of bytes within a given data word are acceptable. That is, certain combinations are not acceptable to the system bus and accompanying peripheral devices because of prior industry decisions.

The validity of the combinations must be determined before new data is written into the data store queue memory locations. Signals TBE0~-TBE3~ are so designated to differentiate them as byte present signals from the previous entries. Byte present signals BE20~-BE23~ are the current byte presents. By combining the previous signals with the current signal in NAND gate 631 and 637, and compound gate 633, 634 and 636, the desired combinations result in the generation of signal BEOK~. That signal is used in the address temporary word 423 (FIG. 19) to generate signal SQEQADD which is then input to NAND gate 591 of Q address control 425, shown in FIG. 29. The operation of this match was described above. The development of signal BEOK~ eliminates the problem of illegal mapping of bytes within a data word.

After data words have been stored in the store queue, along with their corresponding memory addresses and byte presents, they must be read from store queue into the memory or other storage device as determined by processor 11 through the use of POP~ signal. POP~ is impressed on the D input of latch 577 (FIG. 29) which, in combination with latch 578, controls the incrementing of read incrementer 563 and the: clearing of SQFULL 580. Signal POPA~ from the QN output of latch 578 causes read incrementer 563 to increment every time a read is performed. The application of signal POPA to the CLR input of SQFULL 580 enables SQFULL to indicate that it is not full because a read was just completed.

FIG. 27 schematically illustrates block 526 which is shown in FIG. 25 and is a component of address store queue 424 shown in FIG. 22. FIG. 25 schematically illustrates block 492 of address store queue 424 shown in FIG. 22. Comparisons are made between the current address being information being presented to the store queue with the contents in the store queue. The comparisons come out of the M5, 6, 7, 8, 9, 10, 11 bus.

In FIG. 28 those comparisons are ANDed together with the signals VALID 0–VALID 3, developed as shown in the schematic of FIG. 18 in which the byte enable signals from block 441–444 are combined as shown to determine whether the word contains an active entry which has not been written to memory. A logical combination of all the signals yields the signal CONFLICT which, inverted, provides an input to OR gate 692 shown in FIG. 36.

Signal SETADSL~ (start read) provides the second input to OR gate 692 so that if there is a CONFLICT signal and certain other conditions exist, a signal PQFLUSH~ is output from the circuit and sent to processor 11.

When there is no signal CONFLICT or signal PQFLUSH~ asserted, then a read is made from store queue for the information to be written into memory.

Referring again to FIG. 11 where data store queue 116 is shown in block form, signals WRAC0 and WRAC1 are shown buffered as signals RA1 and RA0 for reading data at the selected store queue address. Note that signals RA0 and RA1, as originated from read incrementer 563, were buffered and shown as signals WRA1 and WRA0 in FIG. 11 and FIG. 12.

FIG. 22 illustrates signals WA0 and WA1 selecting the memory address at the selected store queue address. This is shown schematically in FIG. 24.

FIG. 16 illustrates RA0 and RA1 selecting the byte presents at the same store queue address as that of the data and address store queue addresses. This selection is shown schematically in FIG. 17.

The memory is then referenced at the memory address with the data present from the store queue. For a more detailed understanding of the operation of the memory, reference should be made to U.S. patent applications Ser. No. 07/530,137, filed May 25, 1990 for "Dual Path Memory Retrieval System For An Interleaved Dynamic RAM Memory Unit", now U.S. Pat. No. 5,261,068, and U.S. patent application Ser. No. 07/540,049, filed Jun. 19, 1990, for "Digital computer Having A System For Sequentially Refreshing And An Expandable Dynamic RAM Memory Circuit", now abandoned, both of which applications are assigned to the assignee of this invention and both of which are hereby incorporated by reference.

As set out above, this invention provides for storing words to be written in a computer main memory or other storage device, to be written first into a store queue. If validly positioned bytes are to be written into the main memory at identical addresses, the store queue invention accumulates those bytes. Each address has the bytes accumulated wherever possible. When the processor determines that store queue should now write to the memory, the word or partial word to be written into the memory is read from the store queue. As shown above, a moderate amount of housekeeping is required to maintain consistency.

Figure 37:
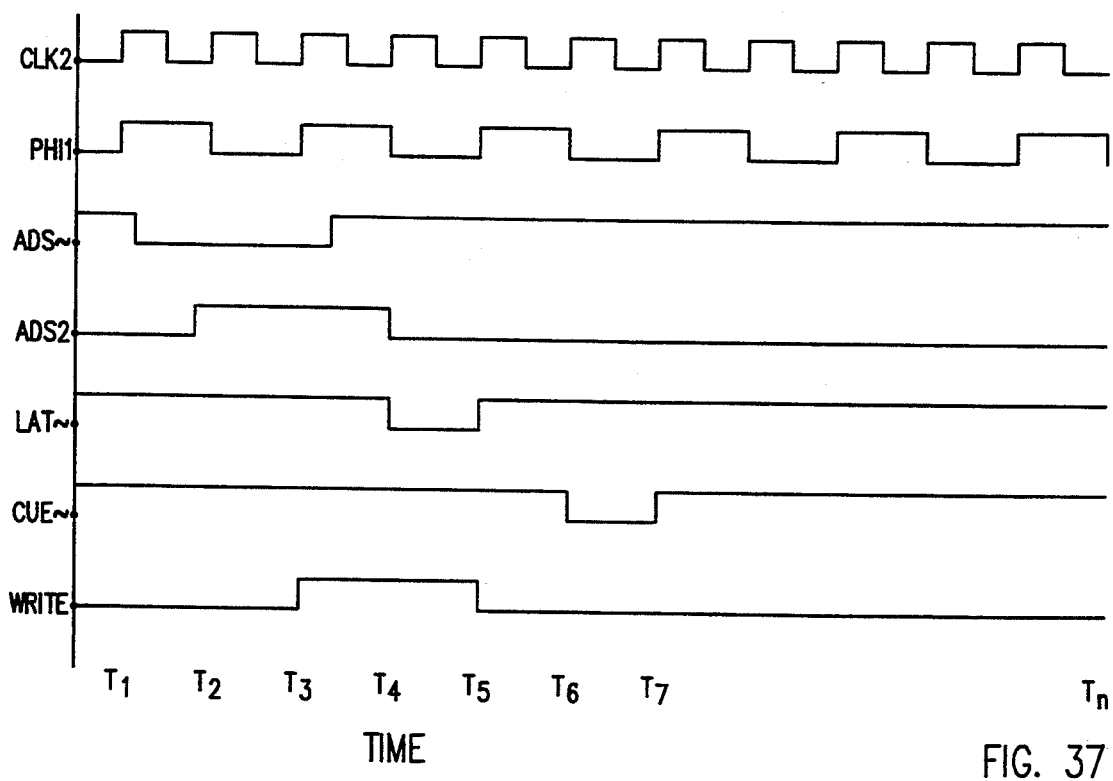
FIG. 37 is a timing chart illustrating various signals used in the system.

FIG. 37 is a timing diagram illustrating the clock signal CLK2 providing a train of pulses equal in time and amplitude. Signal PHI1 is one-half the frequency of signal CLK2. Signal ADS~, indicating the beginning of a cycle is shown being asserted just after the rising edge of signal PHI1 and being deasserted after the second rising edge of signal PHI1. Signal ADS2 is asserted upon the trailing edge of PHI1 and deasserted upon the next trailing edge of signal PHI1. Signal LAT~ is asserted upon the trailing edge of signal ADS2 and deasserted one CLK 2 later. Signal WRITE is asserted for 2 CLK2 cycles, one CLK2 cycle after ADS2 is deasserted, or when the queue is not full. Signal CUE~ is asserted 1 CLK2 cycle after WRITE is deasserted.

All of the above described signals are seen throughout the schematics of this application so that the various timing relationships can be better understood. Those skilled in the art may vary the segment size, the circuitry, the number of words in the queue, the type of memory device, all without departing from the spirit and scope of this invention which is limited only by the appended claims.

The invention claimed is:

1. A digital computer system, including at least one central processor unit (CPU) and having at least one memory for storing data words of a predetermined size (full word) that are written by the CPU, each said full word being made up of a plurality of separately storable data segments, each said data segment being designated by a segment enable signal, the computer system comprising:

a CPU bus;

a memory bus;

data register means, electrically connected between the CPU and the memory via the CPU bus and the memory bus, respectively, for receiving at least a portion of the plurality of the data segments written from the CPU for storage in the memory, the data register means storing only a subset of all possible combinations of said data segments;

address register means, electrically connected to the CPU via the CPU bus, for receiving memory addresses corresponding to the data segments written from the CPU;

segment present register means, electrically connected to the data register means and the address register means, for receiving the designated segment enable signals and for indicating positions of the data segments within the data words;

control means, electrically connected to the data register means, for assembling the data segments in the data register means corresponding to the positions indicated by the segment present register means and corresponding to the memory addresses, and for presenting to the memory the full words, partial words made up of less than the plurality of data segments, and unassembled data segments for storage therein at the corresponding memory addresses; and valid segment enable means, electrically connected to said address register means, said segment present register means, and said control means, for testing all combinations of data segment positions and for providing an output only when the combinations of data segments is valid to enable the control means to assemble the data segments, said valid segment enable means receiving the positions of the data segments presently in the data register means from the segment present register means and the positions of the data segments to be stored in the data register means from the address register means and combining said positions to test for a valid combinations of the data segments.

2. The system of claim 1 wherein the data register means comprises a data register queue, including a plurality of data store queue registers, each having a store queue address, and each capable of containing a full word, a partial word or an unassembled segment.

3. The system of claim 2 wherein the address register means comprises an address register queue, including a plurality of address store queue registers, each having a store queue address, arid each indicating the memory addresses of the corresponding full words, the partial words and the unassembled data segments.

4. The system of claim 3 wherein the segment present register means comprises a segment present queue, including a plurality of segment present store queue registers, each having a store queue address, and each indicating the positions of data segments within the corresponding data words, partial words, or unassembled data segments.

5. The system of claim 4 wherein the data register means further comprises:
(a)(i) a decoder, for determining the store queue address of the data store queue register in which the full word, the partial word, or the unassembled data segment will be stored; and
(ii) a multiplexer, operatively connected to the memory for selecting the store queue address of the data store queue register to have its contents stored in the memory.

6. The system of claim 5 wherein the address register means further comprises:
(b)(i) a decoder, for determining the store queue address of the address store queue which the memory address for the full word, partial word, or unassembled data segment will be stored; and
(ii) a multiplexer, operatively connected to the memory for selecting the store queue address of the address store queue register to write the full word, the partial word, or the unassembled data segment into the memory at the memory address.

7. The system of claim 6 wherein the segment present register means further comprises:
(c)(i) a decoder, for determining the store queue address of the segment present store queue register for storing indicators of the positions of each data segment present within the corresponding data word; and
(ii) a multiplexer, operatively connected to the memory, for selecting the store queue address of the segment present store queue register for indicating the data segments to be stored in the memory at the memory address.

8. The system of claim 7 wherein the control means comprises:
(d)(i) means for comparing the memory address at which the selected partial word or unassembled data segment is to be stored with an incoming memory address at which a subsequently selected partial word or unassembled data segment is to be stored; and
(ii) means for entering the subsequently selected partial word or unassembled data segment into the segment present store queue register having the selected partial word or unassembled data segment, at the indicated positions, upon a match from the comparison of memory addresses.

9. The system of claim 8 wherein the data register means further comprises a data temporary word storage for storing the data word, the partial word, or the unassembled data segment, before being stored in the data register queue.

10. The system of claim 9 wherein the address register means further comprises an address temporary word storage for storing the memory address of the corresponding data word, partial word, or data segment, before being stored in the address register queue.

11. The system of claim 10 wherein the segment present register means further comprises a segment present temporary word storage for storing the segment positions of the data segments of the corresponding data word, partial word, or unassembled data segment, before being stored in the segment present queue.

12. The system of claim 11 wherein the store queue address for the data store queue register, the store queue address of the address store queue register containing the memory address at which the contents of the data store register are to be stored, and the store queue address of the segment present store queue register at which the segment positions of the contents of the data store register are indicated, are identical.

13. The system of claim 12 wherein each data segment comprises an eight bit byte.

14. The system of claim 13 wherein the full word comprises four bytes.

15. The system of claim 14 wherein the data register queue comprises four data store queue registers, the address register queue comprises four address store queue registers, and the segment present queue comprises four segment present store queue registers.

16. The system of claim 15 wherein the valid segment enable means comprises logic circuitry for receiving the positions of the data segments presently in the data register means and the positions of the data segments to be stored in the data register means, and for combining the positions to test the invalid combinations and to provide a true output in the absence of any invalid combination.

17. The system of claim 16 wherein the data segments comprise eight bit bytes.

18. A store queue system for organizing and storing a plurality of writes of data segments from a central processing unit (CPU) within a computer system into a word configuration consisting of a plurality of data writes, and for transferring the stored word configuration of data to memory, the store queue system comprising:

a system bus, having address, data and control signals, electrically connected to said CPU and to said memory;

a data latch, connected to said system bus, for latching at least a portion of the data segments corresponding to said plurality of writes from said CPU, said data latch storing only a subset of all possible configurations of said data segments;

an address latch, connected to said system bus, for latching address signals corresponding to said latched data signals written by said CPU;

a byte present bit queue, connected to said data latch and address latch, for identifying a position within said word configuration for each said data segment that is latched by said data latch;

control means, connected to the data latch and the byte present bit queue, for configuring the data segments in the data latch corresponding to the positions indicated by the byte present bit queue and corresponding to the address signals, and for presenting to the memory said configured data segments; and valid pattern generator, connected to said data latch, said address latch, and said byte present bit queue, for receiving said identified position within said word configuration for each said data segment that is latched in said data latch and the position of one of said data segments that will be stored in the data latch, for combining said positions to test for a valid configuration of the data segments, and for enabling said control means to transfer said configured data segments to the memory only when the configuration of data segments is valid.

* * * * *